United States Patent
Tsutsui et al.

[11] Patent Number: 6,115,334
[45] Date of Patent: Sep. 5, 2000

[54] METHOD AND APPARATUS FOR DETERMINING AND ADJUSTING AN INCLINATION ANGLE BETWEEN RECORDING/REPRODUCING HEAD AND DISK IN A RECORDING/REPRODUCING SYSTEM

[75] Inventors: Keiichi Tsutsui, Kanagawa; Katsuji Igarashi, Tokyo, both of Japan

[73] Assignee: Sony Corporation, Tokyo, Japan

[21] Appl. No.: 08/661,308

[22] Filed: Jun. 13, 1996

[30] Foreign Application Priority Data

Jun. 16, 1995 [JP] Japan .................................. 7-150025

[51] Int. Cl.[7] .................................................. G11B 7/00
[52] U.S. Cl. .................................. 369/44.32; 369/44.29; 369/44.34
[58] Field of Search .......................... 369/44.32, 44.34, 369/44.35, 44.29, 54, 44.41

[56] References Cited

U.S. PATENT DOCUMENTS

| | | | |
|---|---|---|---|
| 4,608,680 | 8/1986 | Yano | 369/44.32 |
| 5,001,690 | 3/1991 | Kamiya et al. | 369/44.32 |
| 5,027,336 | 6/1991 | Sugiura | 369/44.32 |
| 5,302,834 | 4/1994 | Murao | 369/44.32 |
| 5,523,989 | 6/1996 | Ishibashi | 369/44.32 |
| 5,703,855 | 12/1997 | Kirino et al. | 369/44.32 |
| 5,805,543 | 9/1998 | Takamine et al. | 369/44.32 |

FOREIGN PATENT DOCUMENTS 359186145A 10/1984 Japan .
403242832A 10/1991 Japan .

*Primary Examiner*—Thang V. Tran
*Attorney, Agent, or Firm*—Frommer Lawrence & Haug, LLP.; William S. Frommer; Gordon Kessler

[57] ABSTRACT

The invention provides a recording and/or reproduction apparatus for a record medium in the form of a disk by which the necessity for adjustment of an inclination of a head with respect to a disk upon production of the apparatus is eliminated and correct reproduction of data can be assured irrespective of a variation with respect to time. A control circuit controls an offset generation circuit to generate a predetermined offset signal. A skew servo circuit drives a skew motor in response to the offset signal to adjust the relative angle of an optical head with respect to an optical disk to a predetermined angle. A level detection circuit detects the amplitude of the tracking error signal then and outputs it to the control circuit. The control circuit adjusts the offset signal to be outputted from the offset generation circuit so that the amplitude of the tracking error signal may be maximum.

13 Claims, 15 Drawing Sheets

AMPLITUDE-SKEW SENSOR OUTPUT CHARACTERISTIC

SEARCH FOR POINT AT WHICH
INTERMEDIATE POINT EXHIBITS
MINIMUM VALUE WITH RESPECT TO
VARIATION OF ADJUSTMENT VALUE

MAXIMUM AMPLITUDE SEARCH METHOD 1

JITTERS-SKEW SENSOR OUTPUT CHARACTERISTIC

SEARCH FOR POINT AT WHICH
INTERMEDIATE POINT EXHIBITS
MINIMUM VALUE WITH RESPECT TO
VARIATION OF ADJUSTMENT VALUE

MINIMUM JITTERS SEARCH METHOD 1

MINIMUM JITTERS SEARCH METHOD 2

METHOD AND APPARATUS FOR DETERMINING AND ADJUSTING AN INCLINATION ANGLE BETWEEN RECORDING/REPRODUCING HEAD AND DISK IN A RECORDING/REPRODUCING SYSTEM

BACKGROUND OF THE INVENTION

This invention relates to a disk recording and/or reproduction apparatus and method, and more particularly to a disk recording and/or reproduction apparatus and method by which the inclination between a head for recording or reproducing information onto or from a disk and the disk can always be adjusted to a correct condition.

FIG. 15 shows a construction of an exemplary one of related art reproduction apparatus for an optical disk. Referring to FIG. 15, an optical disk 1 is rotated at a predetermined speed by a spindle motor 2. An optical head 3 irradiates a laser beam upon the optical disk 1 and receives reflected light from the optical disk 1. A skew sensor 4 is fixed to a common base (not shown) with the optical head 3 and detects a relative inclination between the optical head 3 and the optical disk 1.

A PLL (phase locked loop) circuit 5 binary digitizes a RF signal reproduced from a signal recorded on the optical disk 1 and outputted from the optical head 3 to produce a binary RF signal and extracts clocks included in the RF signal to produce a synchronizing clock signal. A CLV circuit 6 receives the binary RF signal and the synchronizing clock signal outputted from the PLL circuit 5 and outputs an error signal in phase between them. A switch 8 is controlled by a control circuit 17 to select one of the output of the CLV circuit 6 and the output of an initial driving circuit 7 and outputs the selected output to the spindle motor 2.

The optical head 3 produces a focusing error signal in accordance with, for example, a principle of an astigmatism method and further produces a tracking error signal in accordance with, for example, a principle of a push-pull method. A focusing servo circuit 9 receives the focusing error signal outputted from the optical head 3 and drives a focusing coil 12 in response to the focusing error signal to perform focusing control of the optical head 3 in a direction perpendicular to (toward or away from) the optical disk 1. A tracking servo circuit 10 receives a tracking error signal outputted from the optical head 3 and drives a tracking coil 13 in response to the tracking error signal to perform tracking control of the optical head 3 in a direction perpendicular to the direction of a track of the optical disk 1.

The skew sensor 4 generates a skew error signal corresponding to the inclination between the optical head 3 and the optical disk 1 and outputs the skew error signal to a skew servo circuit 11. The skew servo circuit 11 drives a skew motor 14 in response to the skew error signal to adjust the relative inclination of the optical head 3 with respect to the optical disk 1.

A signal outputted from the tracking servo circuit 10 is supplied to a thread servo circuit 15. The thread servo circuit 15 drives a thread motor 16 in response to the signal to move the optical head 3 in a radial direction of the optical disk 1. The control circuit 17 controls the focusing servo circuit 9, the tracking servo circuit 10, the skew servo circuit 11 and the thread servo circuit 15 as well as the switch 8.

When the optical disk reproduction apparatus is produced, after a disk for adjustment (standard disk) is loaded in position as the optical disk 1 into the optical disk reproduction apparatus, the control circuit 17 controls the thread servo circuit 15 to drive the thread motor 16 to feed the optical head 3 to a predetermined reference position (for example, the position of an innermost circumferential track) of the optical disk 1 (disk for adjustment). Then, the control circuit 17 changes over the switch 8 to the initial driving circuit 7 side so that an initial driving signal outputted from the initial driving circuit 7 is supplied to the spindle motor 2 via the switch 8 to drive the spindle motor 2.

Further, the control circuit 17 controls the focusing servo circuit 9 and the tracking servo circuit 10 to drive the focusing coil 12 and the tracking coil 13 in response to the focusing error signal and the tracking error signal outputted from the optical head 3 to perform focusing servoing and tracking servoing, respectively.

The switch 8 is changed over to the CLV circuit 6 side after the spindle motor 2 is driven for a predetermined period of time. The PLL circuit 5 binary digitizes a RF (radio frequency) signal reproduced from a signal recorded on the optical disk 1 by and reproduced from the optical head 3 to produce a binary RF signal and produces a synchronizing clock signal from the RF signal, and supplies the two signals to the CLV (constant linear velocity) circuit 6. The CLV circuit 6 compares the binary RF signal and the synchronizing clock signal in phase with each other and supplies an error signal between them to the spindle motor 2 via the switch 8. Consequently, the spindle motor 2 rotates the optical disk 1 so that the linear velocity of it may be fixed.

In this condition, the RF signal outputted from the optical head 3 is measured by a measuring instrument (not shown), and the skew servo circuit 11 is controlled by the control circuit 17 so that the amplitude of the RF signal may be maximum. The skew servo circuit 11 controls the skew motor 14 in accordance with the control from the control circuit 17 to adjust the relative angle of the optical head 3 with respect to the optical disk 1. When an optimum adjustment angle is reached, the RF signal exhibits a maximum amplitude. When the RF signal of the maximum amplitude is obtained, the adjustment of the skew servo circuit 11 is ended, and the adjustment value is fixed. As a result, the skew servo circuit 11 thereafter supplies the fixed value to the skew motor 14.

When an ordinary optical disk is loaded in position into and reproduced by the optical disk reproduction apparatus, a skew error signal corresponding to the relative angle of the optical head 3 with respect to the optical disk 1 is outputted from the skew sensor 4. The skew servo circuit 11 compares the skew error signal with the value set upon adjustment and outputs the error signal. The skew motor 14 adjusts the relative angle of the optical head 3 with respect to the optical disk 1 in response to the error signal. Consequently, the optical head 3 is adjusted to an appropriate angle with respect to the optical disk 1.

In the related art apparatus described above, since the inclination of the optical head 3 is adjusted using a disk for adjustment upon shipment of the apparatus from a factory and the inclination is thereafter fixed, there is a subject to be solved that the optical head 3 cannot be adjusted to an appropriate angle in accordance with a dispersion of an individual optical disk.

Further, there is another subject to be solved that, when the inclination of the optical head 3 or the skew sensor 4 changes as a result of a variation with respect to time (aging), it becomes difficult to correctly reproduce data recorded on an optical disk. Particularly where the optical disk 1 is a disk on which information is recorded in a high density such as, for example, a digital video disk (DVD), a displacement of the optical head 3 from an appropriate angle has a significant influence on a result of reproduction.

SUMMARY OF THE INVENTION

It is an object of the present invention to provide a disk recording and/or reproduction apparatus and method by which the necessity for adjustment of an inclination of a head with respect to a disk upon production of the apparatus is eliminated and correct reproduction of data.can be assured irrespective of a variation with respect to time.

In order to attain the object described above, according to an aspect of the present invention, there is provided a recording and/or reproduction apparatus for a record medium in the form of a disk, comprising a pickup means for recording and/or reproducing information onto or from the disk, a first detection means for detecting a relative inclination between the pickup means and the disk in response to a signal reproduced by the pickup means upon starting, and a variation means for varying the relative inclination between the pickup means and the disk in response to a result of the detection of the first detection means.

In the disk driving apparatus, the pickup means records and/or reproduces information onto or from the disk. The first detection means detects a relative inclination between the pickup means and the disk in response to a signal reproduced by the pickup means upon starting, and the variation means varies the relative inclination between the pickup means and the disk in response to a result of the detection of the first detection means. Consequently, adjustment upon production is unnecessary and information can be recorded and/or reproduced onto or from the disk always in an optimum condition irrespective of a dispersion or a variation with respect to time of the disk.

According to another aspect of the present invention, there is provided a recording and/or reproduction method for a record medium in the form of a disk, comprising the steps of recording and/or reproducing information onto or from a disk by pickup means, detecting a relative inclination between the pickup means and the disk based on a signal reproduced upon starting by first detection means, and varying the relative inclination between the pickup means and the disk in response to a result of the detection of the first detection means.

In the recording and/or reproduction method, information is recorded or reproduced onto or from the disk by the pickup means, and a relative inclination between the pickup means and the disk is detected based on a signal reproduced upon starting by first detection means. Then, the relative inclination between the pickup means and the disk is varied in response to a result of the detection of the first detection means. Consequently, information can be recorded and/or reproduced onto or from the disk accurately irrespective of a dispersion or a variation with respect to time of the disk.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENT

Figure 1:
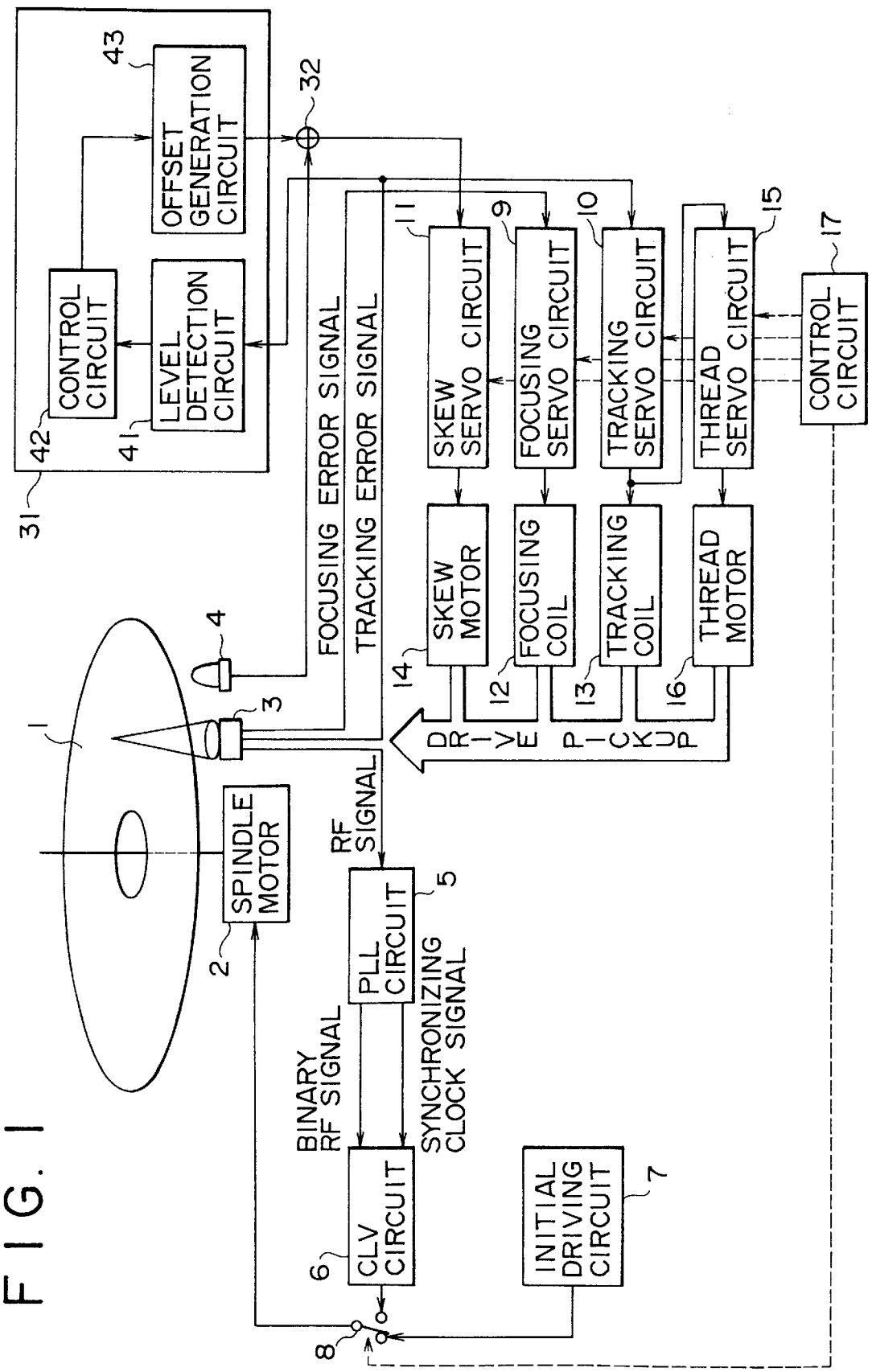
FIG. 1 is a block diagram showing an optical disk reproduction apparatus in which a disk driving apparatus according to the present invention is incorporated.
Figure 15:
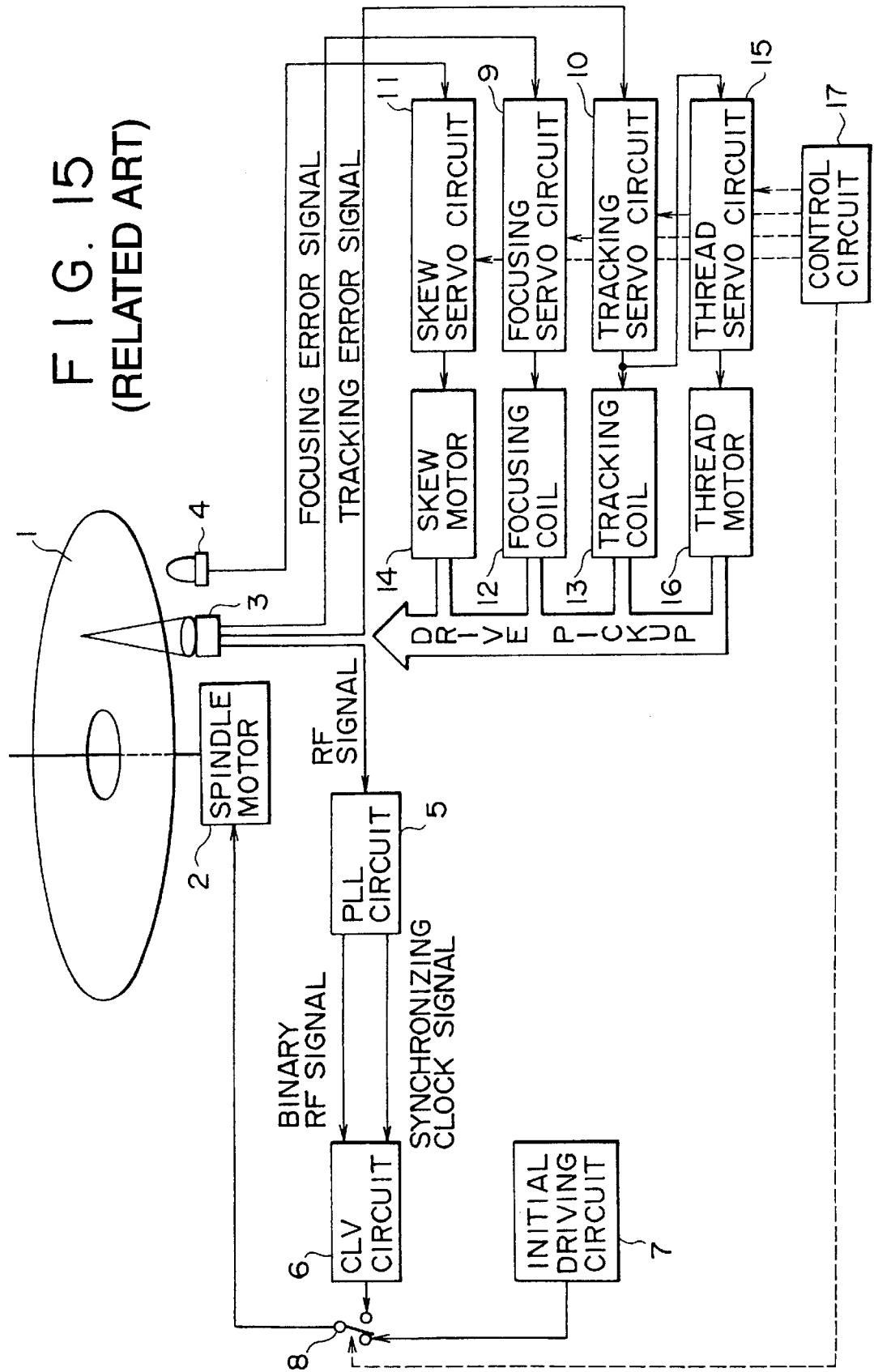
FIG. 15 is a block diagram showing an exemplary one of related art optical disk reproduction apparatus.

FIG. 1 shows a reproduction apparatus for an optical disk in which an optical disk driving apparatus according to the present invention is incorporated. Referring to FIG. 1, the optical disk reproduction apparatus shown is an improvement to and includes several common components with the related art optical disk driving apparatus described hereinabove with reference to FIG. 15. The common components are denoted by like reference numerals, and overlapping description of them is omitted here to avoid redundancy.

The optical disk reproduction apparatus is different from the optical disk driving apparatus in that it additionally includes a tracking error signal maximum amplitude search circuit 31 and an adder 32. The tracking error signal maximum amplitude search circuit 31 includes a level detection circuit 41, a control circuit 42 and an offset generation circuit 43. The level detection circuit 41 detects the level of a tracking error signal outputted from the optical head 3 and outputs a result of the detection to the control circuit 42. The control circuit 42 detects an optimum relative angular position between the optical head 3 and the optical disk 1 from the output of the level detection circuit 41. The optical disk 1 has a record (recording/recordable/recorded) layer. The optical disk 1 may have a plurarity of layers.

Figure 2:
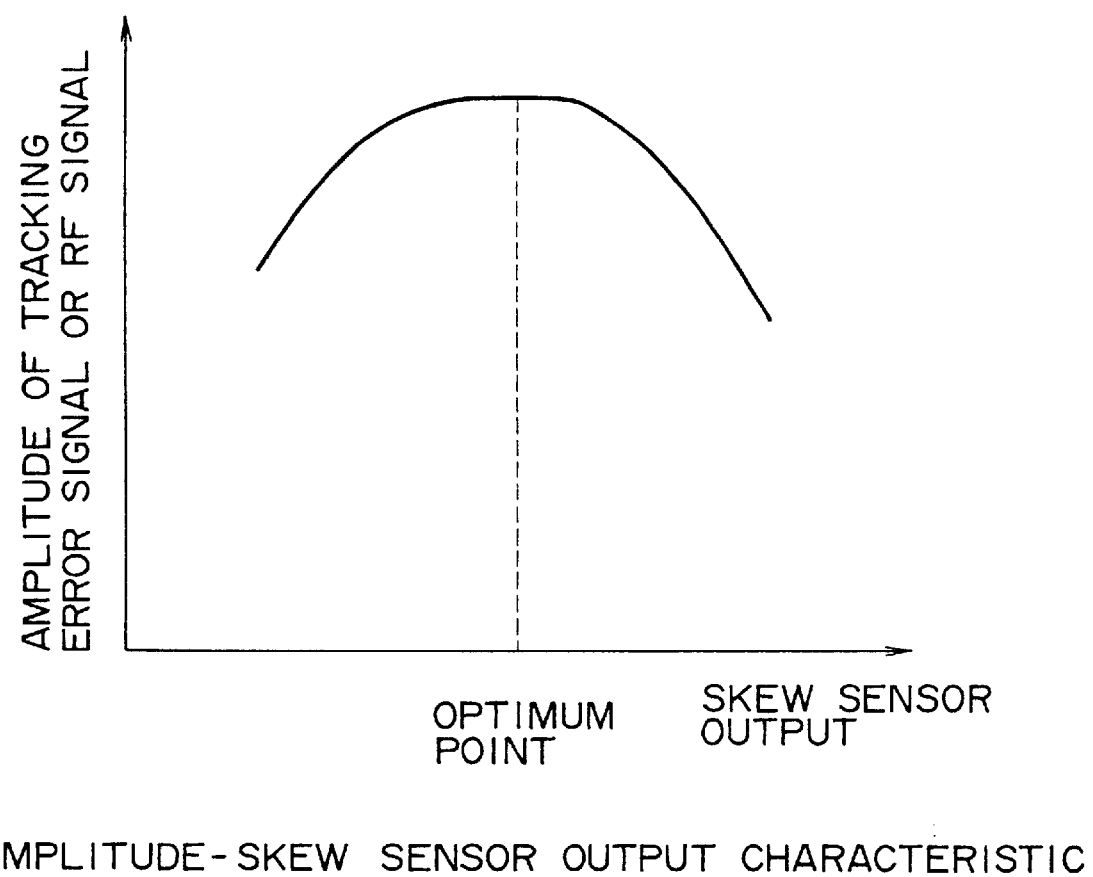
FIG. 2 is a graph illustrating a relationship between an output of a skew sensor and a tracking error signal in the optical disk reproduction apparatus of FIG. 1.

When the relative angle of the optical head 3 with respect to the optical disk 1 varies, the tracking error signal varies as shown in FIG. 2. In particular, when the relative angle of the optical head 3 with respect to the optical disk 1 is adjusted to an optimum angular position (optimum point) (when the angular adjustment is performed so that the output of the skew sensor 4 may have a value corresponding to that obtained in a condition wherein the inclination of the optical head 3 is optimum), the tracking error signal exhibits a maximum amplitude. However, if the position of the optical head 3 is displaced from the optimum point, then the amplitude of the tracking error signal decreases. The control circuit 42 detects an optimum point in accordance with the principle just described.

In order to detect such an optimum point, the control circuit 42 controls the offset generation circuit 43 to generate a predetermined offset signal. The offset signal is added to the skew error signal outputted from the skew sensor 4 by the adder 32. An output of the adder 32 is outputted to the skew servo circuit 11.

In the following, operation of the optical disk reproduction apparatus will be described. When an instruction to start reproduction is received in a condition wherein the optical disk 1 is loaded in position, the control circuit 17 controls the thread servo circuit 15 to move the optical head 3 to an initial position. In particular, the thread servo circuit 15 controls the thread motor 16 under the control of the control circuit 17 to move the optical head 3 to a track in a signal recording area on the innermost circumference of the optical disk 1.

Then, the control circuit 17 changes over the switch 8 to the initial driving circuit 7 side so that an initial driving signal outputted from the initial driving circuit 7 is supplied to the spindle motor 2 via the switch 8 to drive the spindle motor 2 to rotate. Further, the control circuit 17 controls the focusing servo circuit 9 to drive the focusing coil 12 in response to the focus error signal outputted from the optical head 3 to perform focusing servoing.

The control circuit 17 changes over the switch 8 to the CLV circuit 6 side when the spindle motor 2 is driven to rotate for a predetermined time or when the speed of rotation of the spindle motor 2 reaches a predetermined speed.

The PLL circuit 5 receives a RF signal corresponding to data recorded on the optical disk 1 from reflected light from the optical disk 1 when the optical head 3 irradiates a laser beam upon the optical disk 1. The PLL circuit 5 binary digitizes the RF signal and detects a synchronizing signal included in the RF signal. The CLV circuit 6 compares the synchronizing clock signal and the binary RF signal supplied thereto from the PLL circuit 5 with each other in phase and outputs a signal corresponding to the phase error between them.

The error signal is supplied to the spindle motor 2 via the switch 8 so that the spindle motor 2 rotates the optical disk 1 so that the linear velocity of the optical disk 1 may be fixed.

Further, in this instance, the control circuit 17 controls the skew servo circuit 11 to start skew servoing. In particular, the skew sensor 4 irradiates light generated from an LED (not shown) upon the optical disk 1 and detects the balance of reflected light from the optical disk 1. The skew sensor 4 thus outputs a skew error signal which corresponds to the relative angle of the skew sensor 4 (optical head 3) with respect to the optical disk 1. The skew error signal is supplied to the skew servo circuit 11 via the adder 32 so that the skew servo circuit 11 controls the skew motor 14 in response to the skew error signal. The skew motor 14 adjusts the relative angle of the optical head 3 with respect to the optical disk 1 in response to the skew error signal.

Figure 3:
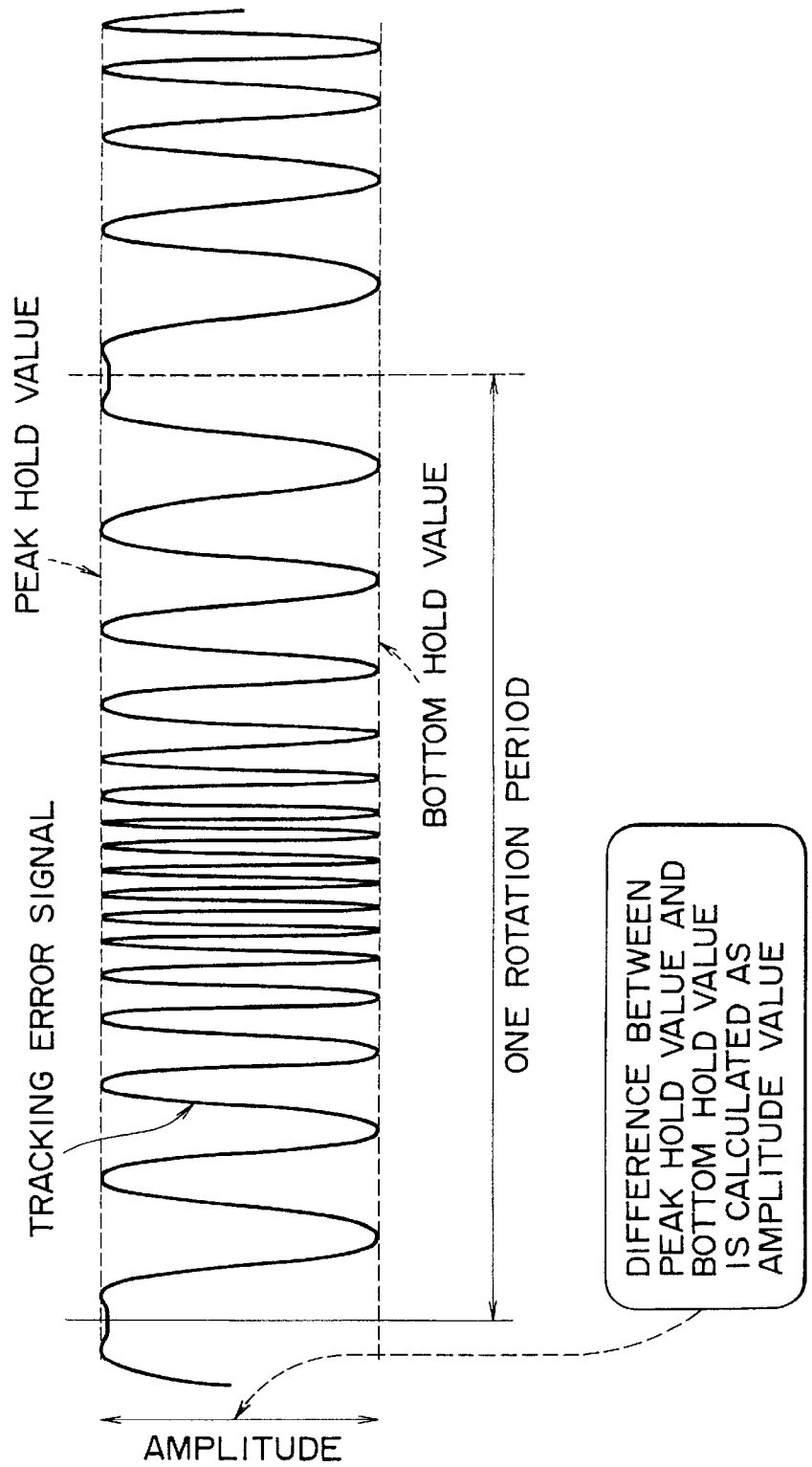
FIG. 3 is a waveform diagram showing a tracking error signal when tracking servoing is off in the optical disk reproduction apparatus of FIG. 1.

At this point of time, however, tracking servoing is not yet started. As a result, the optical head 3 periodically crosses a plurality of tracks of the optical disk 1. In particular, since the centers of rotation of the optical disk 1 and the spindle motor 2 are displaced from each other due to eccentricity between them, the information reproduction point of the optical head 3 (a light spot of the laser beam) periodically crosses a plurality of tracks. As a result, the optical head 3 outputs, for example, such a tracking error signal as shown in FIG. 3. As seen in FIG. 3, the tracking error signal exhibits a periodical variation.

The level detection circuit 41 of the tracking error signal maximum amplitude search circuit 31 detects a peak hold value and a bottom hold value of the tracking error signal and detects a difference between them as an amplitude of the tracking error signal. Then, the amplitude detection signal is supplied to the control circuit 42. The amplitude of the tracking error signal varies in response to the relative angle of the optical head 3 with respect to the optical disk 1 (the output of the skew sensor 4) as shown in FIG. 2. The control circuit 42 detects an optimum point of the skew error signal with which a maximum amplitude of the tracking error signal is obtained by a so-called mountain-climbing method.

Figure 4:
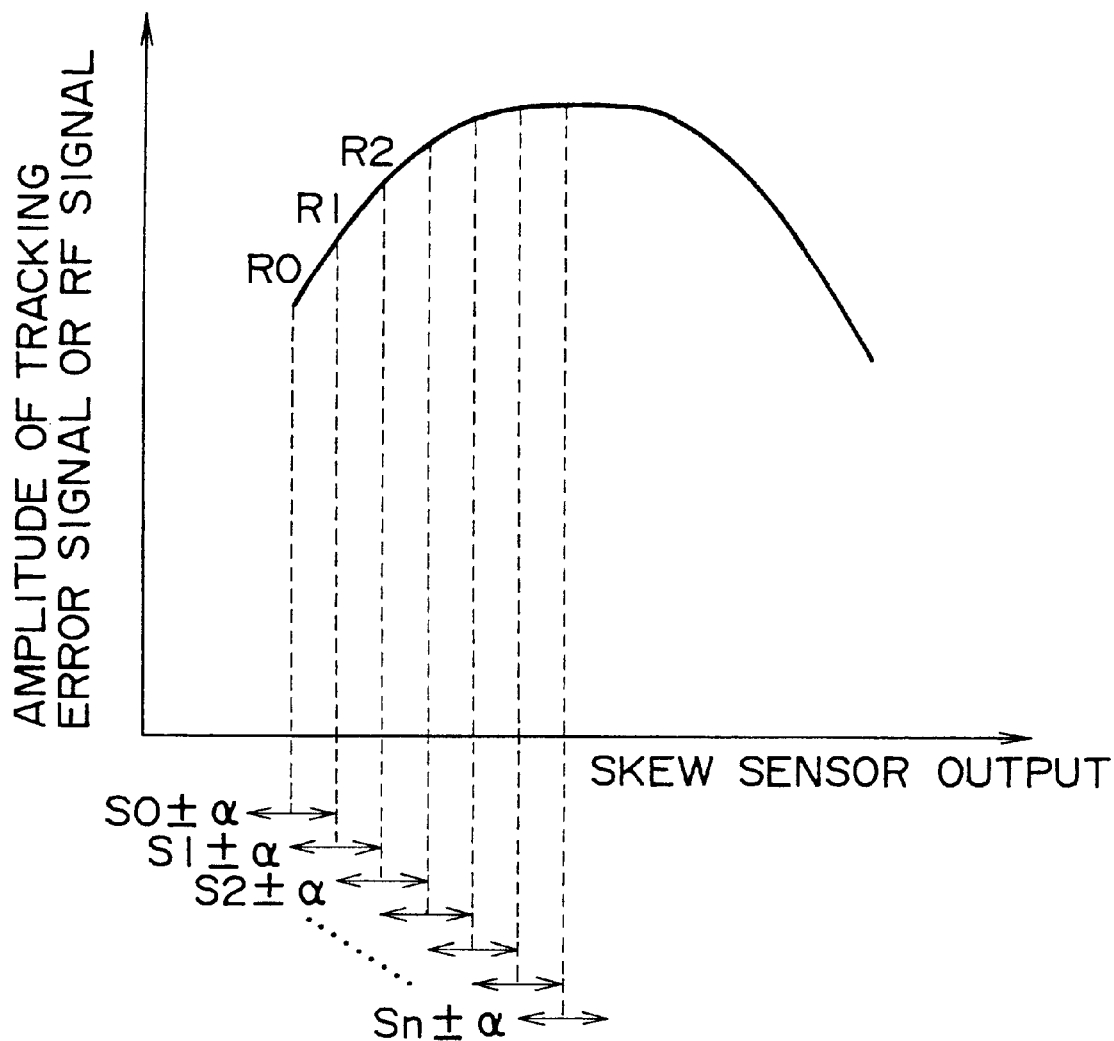
FIG. 4 is a graph illustrating a principle in detecting a maximum value of the amplitude of a tracking error signal by a mountain-climbing method.

In particular, as shown in FIG. 4, the skew error signal to be outputted from the skew sensor 4 (the signal to be inputted to the skew servo circuit 11) is successively incremented by $\alpha$ like $S_0$, $S_1$, $S_2$, . . . Then, the amplitude values $R_{i-1}$, $R_i$ and $R_{i+1}$ of the tracking error signal at each three successive sampling points $S_{i-1}$, $S_i$ and $S_{i+1}$ are compared with each other, and when $R_i$ exhibits the highest value among them ($R_{i-1} < R_i > R_{i+1}$), the sampling point $S_i$ is determined as an optimum point. To this end, the control circuit 42 controls the offset generation circuit 43 to output an offset value which first exhibits a predetermined initial value and thereafter successively varies by $\alpha$. The offset signal is added to the output of the skew sensor 4 by the adder 32 and outputted to the skew servo circuit 11.

Figure 5:
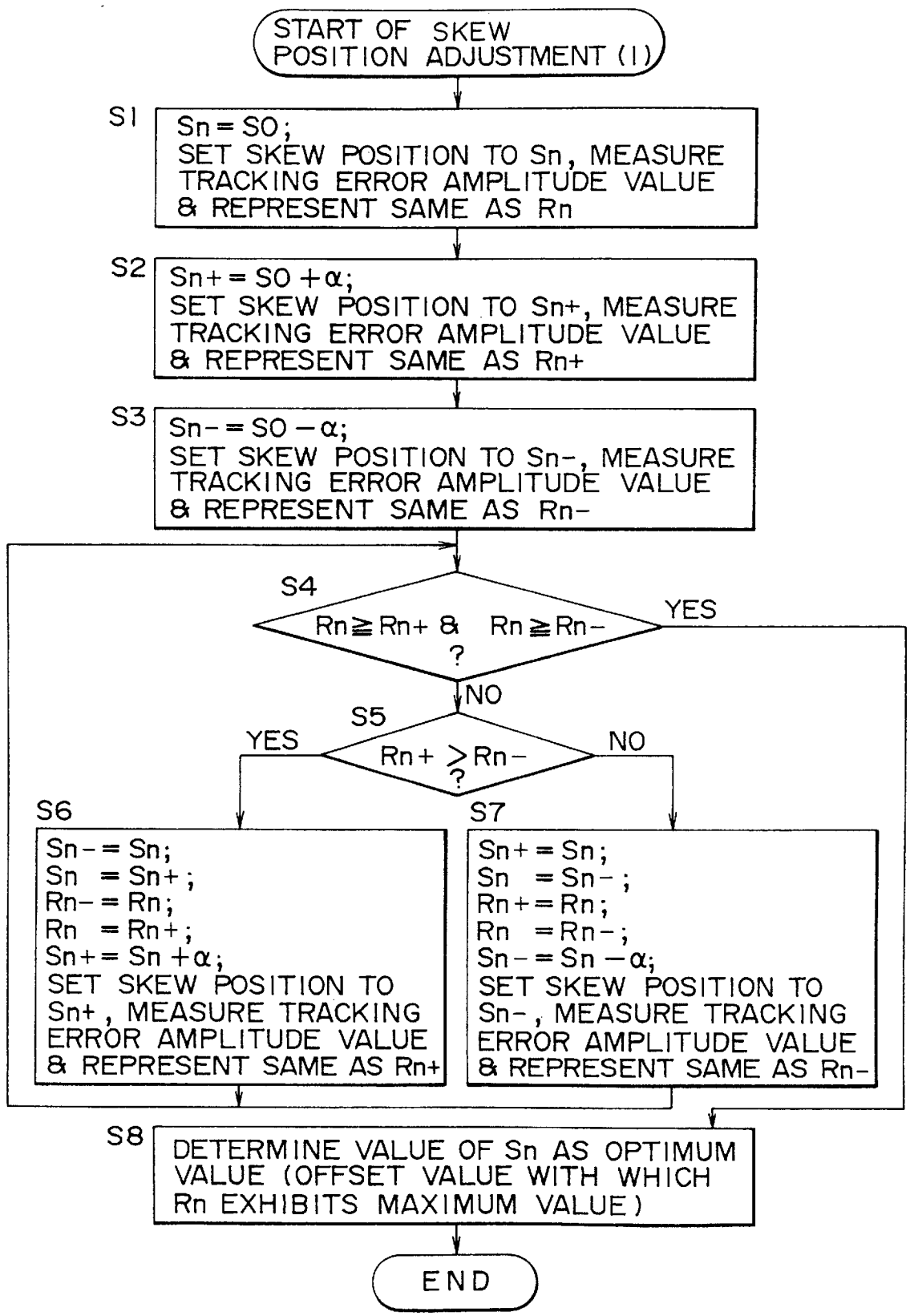
FIG. 5 is a flow chart illustrating processing of detecting a maximum value of the amplitude of a tracking error signal by a mountain-climbing method.

FIG. 5 illustrates an example of processing by the mountain-climbing method when the skew position is adjusted. First in step S1, an initial value $S_0$ is placed into $S_n$. Then, the skew position is set to $S_n$ (in this instance, $S_n = S_0$), and an amplitude value of the tracking error signal in this instance is measured. Then, a result of the measurement is placed into Rn (in this instance, $Rn = R_0$)

In particular, the control circuit 42 controls the offset generation circuit 43 to generate an offset signal $S_0$. The skew servo circuit 11 controls the skew motor 14 in response to the skew error signal to which the offset signal $S_0$ is added by the adder 32 to adjust the inclination of the optical head 3.

The level detection circuit 41 detects the amplitude of the tracking error signal outputted thereupon from the optical head 3 and outputs it to the control circuit 42. The control circuit 42 places the amplitude value of the tracking error signal detected then into Rn (in this instance, $Rn = R_0$).

Thereafter, the control sequence advances to step $S_2$, in which a value obtained by addition of $S_0$ and $\alpha$ is placed into Sn+. In other words, the following equation is calculated:

$$Sn + = S_0 + \alpha$$

Then, the control circuit 42 controls the offset generation circuit 43 to generate such offset signal Sn+ (=$S_1$). In particular, the control circuit 42 controls the offset generation circuit 43 to generate an offset value which is higher by $\alpha$ than the offset signal Sn generated in step S1. Since the skew servo circuit 11 controls the skew motor 14 in response to the skew error signal to which the offset value is added, the optical head 3 further varies the angle thereof by an amount corresponding to the offset value $\alpha$.

The level detection circuit 41 detects the amplitude of the tracking error signal outputted from the optical head 3 then.

The control circuit 42 places the amplitude of the tracking error signal detected by the level detection circuit 41 then into Rn+ (in this instance, $R_0+=R_1$).

Then, the control sequence advances to step S3, in which a value lower by $\alpha$ than $S_0$ is placed into Sn−. In other words, the following equation is calculated:

$$Sn-=S_0-\alpha$$

In particular, the control circuit 42 controls the offset generation circuit 43 to generate a value lower by $\alpha$ than the offset signal Sn (in this instance, $Sn=S_0$) generated in step S1. Since the skew error signal to which the offset signal Sn− is added is supplied to the skew motor 14 via the skew servo circuit 11, the angle of the optical head 3 is varied by an amount corresponding to the offset value −$\alpha$ from that when the offset value $S_0$ was generated.

Then, the level detection circuit 41 thereupon detects the amplitude of the tracking error signal outputted from the optical head 3 and outputs it to the control circuit 42. The control circuit 42 places the amplitude value of the tracking error signal then into Rn− (in this instance, $Rn-=R_0-$).

By the processing in steps S1 to S3 described above, the amplitude value Rn ($=R_0$) of the tracking error signal when the offset value to be added to the skew error signal is set to the initial value $S_0$, the amplitude value Rn+ ($=R_0+=R_1$) of the tracking error signal when the offset signal is increased by $\alpha$ and the amplitude value Rn− ($=R_0-$) when the offset signal is decreased by $\alpha$ are obtained as illustrated in FIG. 4.

Thereafter, the control sequence advances to step S4, in which it is discriminated whether or not Rn is equal to Rn+ or Rn is higher than Rn+ and equal to Rn− or else Rn is higher than Rn−. In other words, it is discriminated whether or not Rn is higher than Rn− and Rn+ (that is, whether or not Rn is a maximum value).

Normally, as seen in FIG. 4, the amplitude Rn ($=R_0$) of the tracking error signal when the offset signal is $S_0$ is higher than the amplitude value Rn− ($=Rn_0-$) when the offset signal is lower by $\alpha$, but is lower than the amplitude Rn+ ($=R_0+=R_1$) of the tracking error signal when the offset signal is higher by $\alpha$. Therefore, in this instance, the control sequence advances to step S5, in which it is discriminated whether or not Rn+ is higher than Rn−. In this instance, since Rn+ ($=R_0+=R_1$) is higher than Rn− ($=R_0-$) (since the values are within a section in which the curve exhibits a rightwardly ascending slope in FIG. 4), the control sequence advances to step S6.

In step S6, Sn ($=S_0$) till then is placed into Sn−. Then, Sn+ ($=S_1$) till then is placed into new Sn, and Rn ($=R_0$) till then is placed into Rn−, and then Rn+ ($=R_1$) till then is placed into Rn. Then, a value ($=S_0+2\alpha=S_2$) obtained by adding $\alpha$ to new Sn ($=S_0+\alpha=S_1$) is placed into Sn+. In other words, the following equation is calculated:

$$Sn+=Sn+\alpha$$

The control circuit 42 controls the offset generation circuit 43 to generate Sn+ ($=S_2$) as an offset signal. In other words, the control circuit 42 controls the offset generation circuit 43 to generate an offset Sn+ ($=S_0+2\alpha=S_2$) higher by $\alpha$ than Sn+ ($=S_0+\alpha$) generated in step S2. Then, the amplitude of the tracking error signal detected then is placed into Rn+ ($=R_1+=R_2$).

In other words, as a result, the amplitude values of the tracking error signal at the three sampling points $S_0$, $S_1$ and $S_2$, which have been shifted rightwardly by $\alpha$ from those till then in the condition shown in FIG. 4, are placed in Rn− ($=R_0$), Rn ($=R_1$) and Rn+ ($=R_2$).

Then, the control sequence returns to step S4, in which it is discriminated whether or not Rn is higher than Rn− and Rn+. When Rn is not the highest value, the control sequence advances to step S5, in which it is discriminated again whether or not Rn is higher than Rn−. When Rn+ is higher than Rn−, the control sequence advances to step S6, in which similar processing is repeated.

Then, if the section for sampling is shifted in the rightward direction in FIG. 4 until Sn comes to an optimum point, the amplitude value Rn obtained then is higher than Rn− and besides higher than Rn+. In other words, Rn exhibits the highest value. Therefore, in this instance, the control sequence advances from step S4 to step S8, in which the value of Sn then is set as an optimum value with which the amplitude Rn of the tracking error signal exhibits a maximum value. In other words, the control circuit 42 thereafter controls the offset generation circuit 43 to continuously generate the offset signal Sn as the optimum value.

On the other hand, when sampling is proceeding in a section in which the curve in FIG. 4 exhibits a rightwardly descending slope, the value of Rn+ exhibits a value lower than Rn−. Therefore, in this instance, the control sequence advances from step S5 to S7, in which Sn till then is placed into Rn+, Sn− till then is placed into Sn, Rn till then is placed into Rn+, and Rn− till then is placed into Rn. Then, a value lower by $\alpha$ than new Sn is placed into Sn−. In other words, the following equation is calculated:

$$Sn-=Sn-\alpha$$

In particular, referring to FIG. 4, the sampling point on the left side is sampled with Sn−. Then, the amplitude value of the tracking error signal when the offset signal Sn− is generated by the offset generation circuit 43 is detected, and the thus detected amplitude value is placed into Rn−.

Then, the control sequence returns to step S4, in which it is discriminated whether or not Rn is higher than Rn− and Rn+. Since Rn is still lower than Rn− in the portion of the characteristic of the rightwardly descending slope in FIG. 4, the control sequence advances to step S5 and then from step S5 to step S7 to repeat similar processing. Then, when the sampling point successively advances in the leftward direction (toward an optimum point) in FIG. 4 until Sn reaches an optimum point, Rn exhibits a value higher than Rn+ and higher than Rn−. In this instance, the control sequence advances from step S4 to step S8, in which the value of the offset signal then is determined as an optimum value. Thereafter, the control circuit 42 controls the offset generation circuit 43 to successively generate the optimum value.

Figure 6:
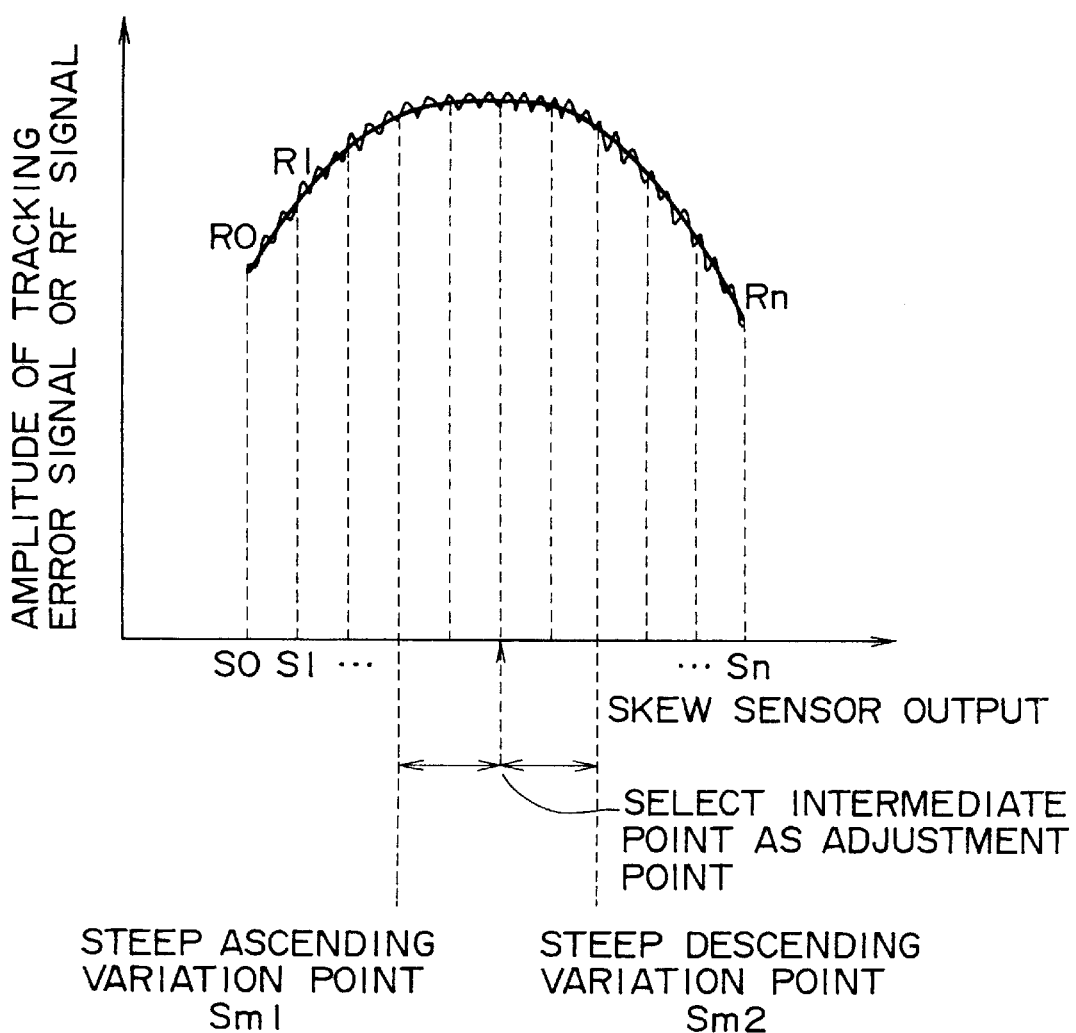
FIG. 6 is a graph illustrating a principle in detecting a maximum value of the amplitude of a tracking error signal from two variation points.

While, in the description above, an optimum point (maximum value) is detected by the so-called mountain-climbing method, the optimum point may be determined otherwise in such a manner as illustrated, for example, in FIG. 6. In particular, in the method illustrated in FIG. 6, the offset signal is successively varied by $\alpha$ to sample the tracking error signal for the entire period from $S_0$ to Sn first. Then, in this instance, the offset signal which corresponds to a point of a sudden ascending variation of the tracking error signal obtained by the sampling is detected as $Sm_1$ whereas the offset signal which corresponds to a point of a sudden descending variation of the tracking error signal is detected as $Sm_2$. Then, a middle point between the variation points $Sm_1$ and $Sm_2$ is determined as an optimum point (adjustment point).

Figure 7:
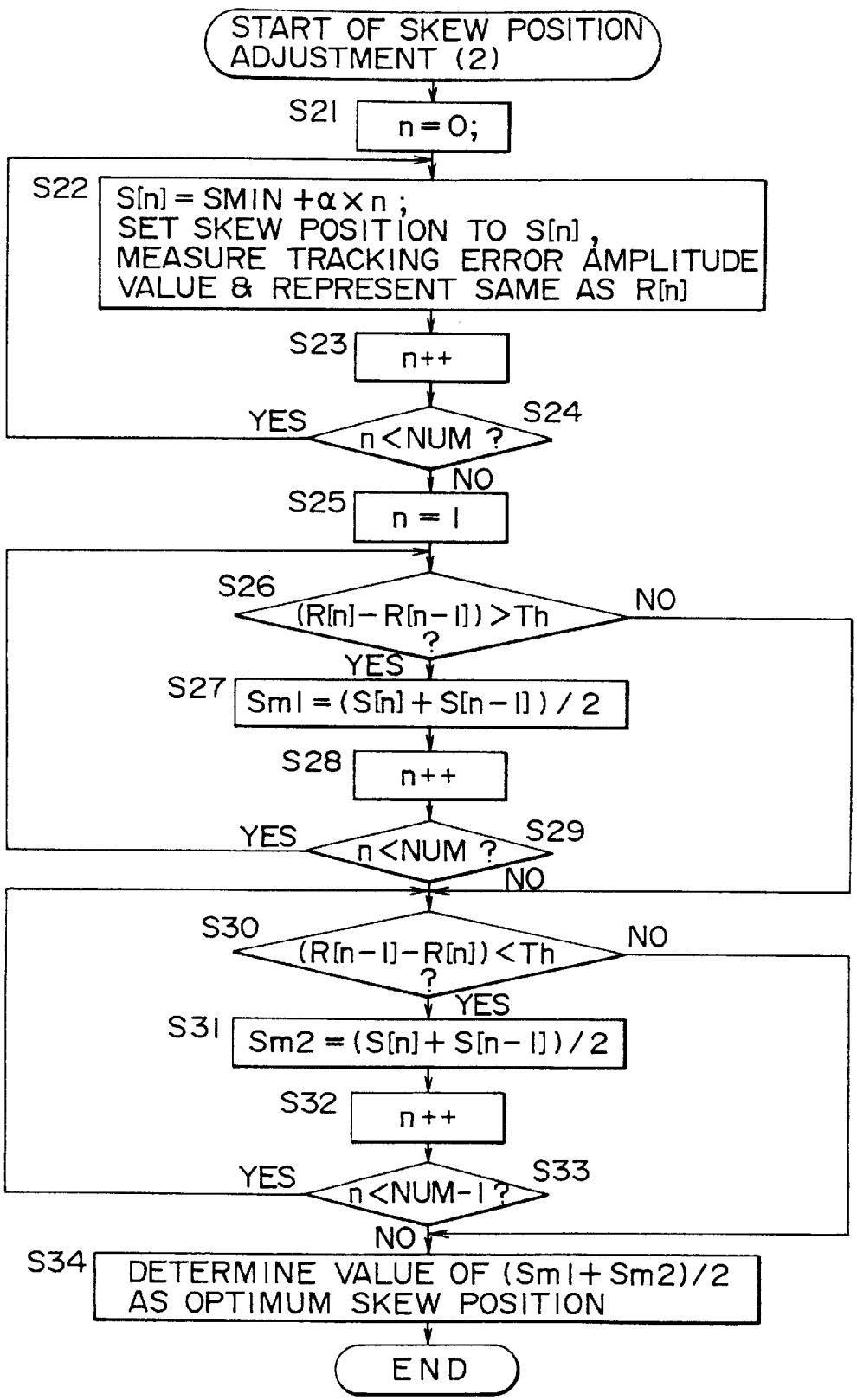
FIG. 7 is a flow chart illustrating processing in accordance with the principle illustrated in FIG. 6.

FIG. 7 illustrates an example of processing when an optimum point is detected based on the method illustrated in FIG. 6. In the present processing, first in step S21, a variable n is initially set to 0, and in step S22, the following equation is calculated:

$$S[n]=SMIN+\alpha \times n$$

Here, SMIN represents a minimum value of the offset adjustment value (offset value), and α represents a width by which the offset signal is varied stepwise.

In the present case, since n=0, S[0] is placed into SMIN.

The control circuit 42 controls the offset generation circuit 43 to generate this S[n] (in the present case, S[0]=SMIN). Thereafter, the amplitude of the tracking error signal then is detected by the level detection circuit 41, and the value thus detected is placed into R[n] (=R[0]).

Then, the control sequence advances to step S23, in which the variable n is incremented by 1 (n is set to n=1). Then in step S24, it is discriminated whether or not the variable n after incremented is lower than NUM. This NUM is a value given, where a maximum value of the offset value is represented by SMAX, by (SMAX−SMIN)/α. In other words, NUM represents a sample number in the skew scanning range.

Where n is lower than NUm, since this signifies that sampling is not yet completed for all sampling points, the control sequence returns to step S22, in which the following equation is calculated:

$$S[n]=SMIN+\alpha \times n$$

In other words, in this instance, a value higher by α than SMIN is set as an offset signal S[1]. Then, the amplitude of the tracking error signal when the offset signal S[1] is generated is measured, and the thus measured value is set as R[1].

Thereafter, the control sequence advances to step S23, in which the variable n is incremented by one, in this instance, to n=2. Then, if it is subsequently discriminated in step S24 that the variable n (=2) is lower than NUM, the control sequence returns to step S22 so that similar processing is executed repetitively. Amplitude values $R_0$ to Rn of the tracking error signal at the sampling points from $S_0$ to Sn shown in FIG. 6 are obtained in this manner.

When the sampling in the search range is completed in such a manner as described above, the variable n becomes equal to NUM. Thus, the control sequence now advances from step S24 to step S25, in which the variable n is initialized to 1. Then, in step S26, it is discriminated whether or not the difference between the amplitude value R[n] at the current reference point and the last amplitude value R[n−1] is higher than a reference value Th set in advance. In the present case, it is discriminated whether or not the value of R[1]−R[0] is higher than Th. Since the curve in FIG. 6 exhibits a rightwardly descending characteristic within a first period of the sampling range as seen in FIG. 6, R[1] is sufficiently higher than R[0] (the difference (R[1]−R[0]) between them is higher than Th). Thus, the control sequence advances to step S27, in which a middle value between the sampling points S[n] and S[n−1] is set as a variation point $Sm_1$. In other words, the following equation is calculated:

$$Sm_1=(S[n]+S[n-1])/2$$

In the present case, a middle point between S[1] and S[0] is set as $Sm_1$.

Thereafter, the control sequence advances to step S28, in which the variable n is incremented by 1 (to n=2), and then to step S29, in which it is discriminated whether or not the variable n is lower than NUM. When the variable n is lower than NUM, the control sequence returns to step S26, in which it is discriminated whether or not the value of R[2]−R[1] is higher than Th. As seen in FIG. 6, within a period within which the tracking error signal exhibits a great variation, the difference between two sample values is higher than the reference value Th. Therefore, the control sequence advances again to step S27, in which $Sm_1$ is set to the value of (S[2]+S[1])/2. In other words, a value at the sample point spaced rightwardly by α from the preceding sample point is set as $Sm_1$.

Then, in step S28, the variable n is incremented by 1 again to n=3, whereafter the control sequence returns from step S29 to step S26 to execute similar processing repetitively.

Then, as the sampling point moves rightwardly in FIG. 6, the rate of change of the tracking error signal decreases gradually. Then, when it is discriminated that the value of R[n]−R[n−1] is lower than Th, the control sequence advances from step S26 to step S30. In other words, in this instance, a point of variation at which the rate of change of the amplitude of the tracking error signal changes from a section in which it is high to another section in which it is low (a sudden ascending variation point) is set as $Sm_1$.

In steps S30 et seq., a point of variation at which the rate of change of the amplitude of the tracking error signal changes from a section in which it exhibits a gradual decrease to another section in which it exhibits a sudden decrease is detected as a sudden descending variation point $Sm_2$.

To this end, in step S30, it is discriminated whether or not the value of R[n−1]−R[n] is lower than the reference value Th. As seen from FIG. 6, within a period within which the sample value R[n−1] on the left side is lower than the sample value R[n] on the right side (within a period within which the curve exhibits a rightwardly ascending slope) as well as within a period within which the sample value R[n] on the right side is lower than the sample value R[n−1] on the left side but the difference between them is small, the value of R[n−1] is lower than the reference value Th. Thus, the control sequence advances from step S30 to step S31, in which a value between S[n] and S[n−1] is set as $Sm_2$. In other words, the following equation is calculated:

$$Sm_2=(S[n]+S[n-1])/2$$

Then, n is incremented by 1 in step S32, and in step S33, it is discriminated whether or not the variable n is lower than NUM−1 (whether or not the search range has reached the right end in FIG. 6). When the variable n is lower than NUM−1, the control sequence returns to step S30, in which similar processing is repeated for two sample values on the right side spaced by one sample distance in FIG. 6. Then, when the difference between the two sample values is lower than the reference value Th, the control sequence advances again to step S31, in which a middle value between the two sampling points is set as $Sm_2$.

When the sampling point is successively shifted in the rightward direction in FIG. 6 in this manner until the sample value R[n] on the right side in FIG. 6 exhibits a sudden decrease from the sample value R[n−1] on the left side, the difference between them (R[n−1]−R[n]) becomes equal to or higher than the reference value Th. In this instance, a middle value between the sample points S[n−1] and S[n−2] is set as $Sm_2$. Thus, the value then is determined as a sudden descending variation point $Sm_2$.

Since the sudden ascending variation point $Sm_1$ has been determined in step S27 and the sudden descending variation point $Sm_2$ has been determined in step S31 in such a manner as described above, the control sequence advances to step S34, in which a middle point between the variation points $Sm_1$ and $Sm_2$ is determined as an optimum point. In other words, the value of $(Sm_1+Sm_2)/2$ is set as an optimum point.

It is to be noted that, when it is discriminated in step S29 that the variable n is equal to or higher than NUM, the control sequence advances from step S29 to step S30. On the other hand, when it is discriminated in step S33 that the variable n is equal to or higher than NUM−1, the control sequence advances from step S33 to step S34.

Figure 8:
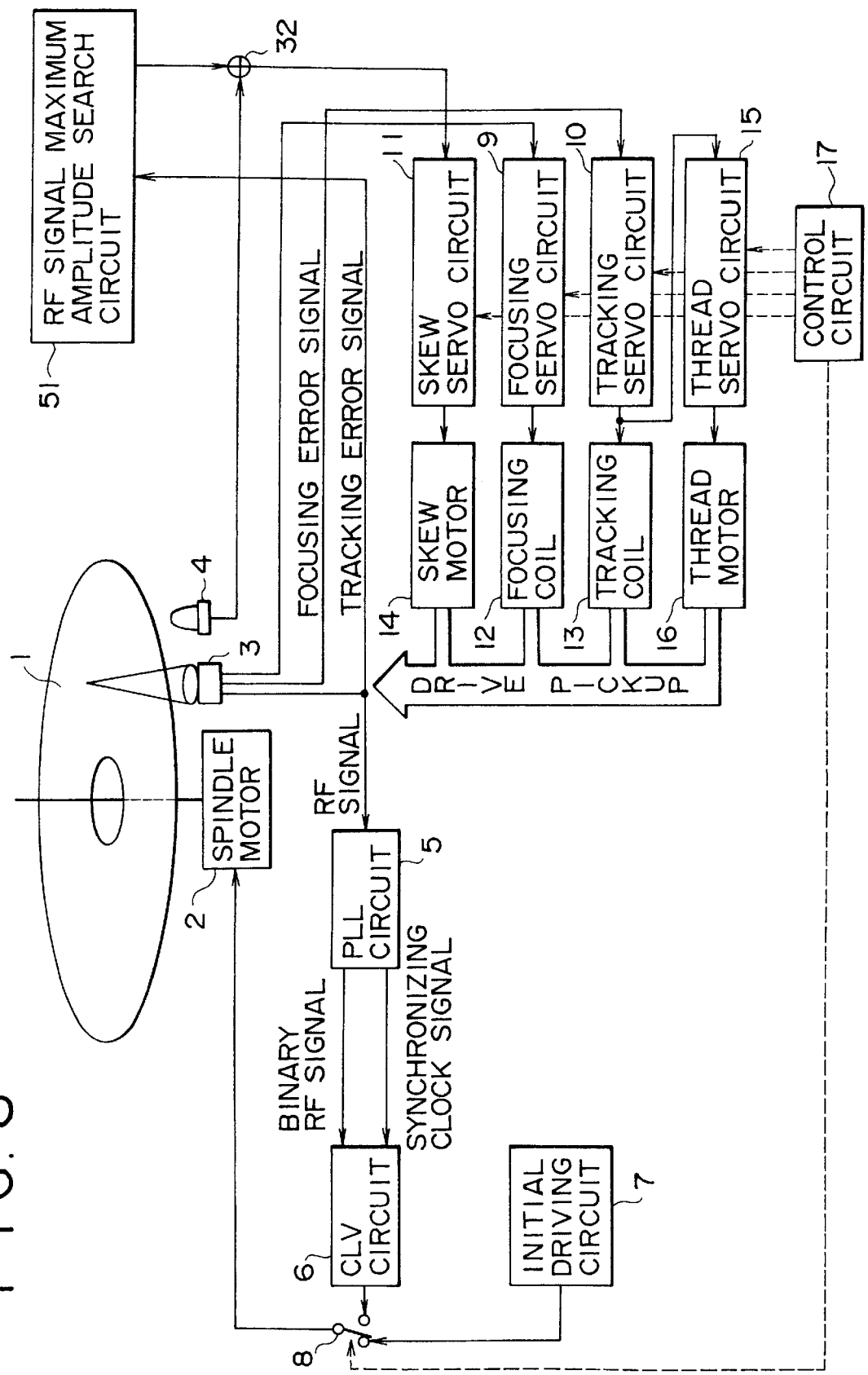
FIGS. 8 and 9 are block diagrams showing different optical disk reproduction apparatus in which different optical disk driving apparatus according to the present invention are incorporated.

FIG. 8 shows another optical disk reproduction apparatus in which another disk driving apparatus according to the present invention is incorporated. Referring to FIG. 8, the optical disk reproduction apparatus shown has a similar construction to that of the optical disk reproduction apparatus described hereinabove with reference to FIG. 1 except that it includes a RF signal maximum amplitude search circuit 51 in place of the tracking error signal maximum amplitude search circuit 31 shown in FIG. 1. A RF signal outputted from the optical head 3 is inputted to the RF signal maximum amplitude search circuit 51.

Though not shown, the RF signal maximum amplitude search circuit 51 includes a level detection circuit, a control circuit and an offset generation circuit similar to those of the tracking error signal maximum amplitude search circuit 31 shown in FIG. 1.

In the optical disk driving apparatus of FIG. 8, when an instruction to start a reproduction operation is developed, the control circuit 17 first feeds the optical head 3 to the position of the innermost circumferential track of the optical disk 1 and then drives the spindle motor 2 to rotate the optical disk 1 similarly as in the optical disk driving apparatus of FIG. 1. Thereafter, the skew servo circuit 11, the focusing servo circuit 9 and the tracking servo circuit 10 are all put into an operative condition. In other words, skew servoing, focusing servoing and tracking servoing are rendered effective.

The relationship between the skew error signal and the amplitude of the RF signal in this condition is illustrated by a graph in FIG. 2, 4 or 6. In particular, when the relative angle of the optical head 3 with respect to the optical disk 1 is set to an optimum value, the RF signal exhibits a maximum amplitude. Accordingly, by detecting a maximum value of the amplitude of the RF signal by means of the RF signal maximum amplitude search circuit 51 in a similar manner as in that when a maximum value of the amplitude of the tracking error signal is detected, an optimum point can be searched for and set. Since the processing is similar to that in the first embodiment of FIG. 1, description thereof is omitted.

Figure 9:
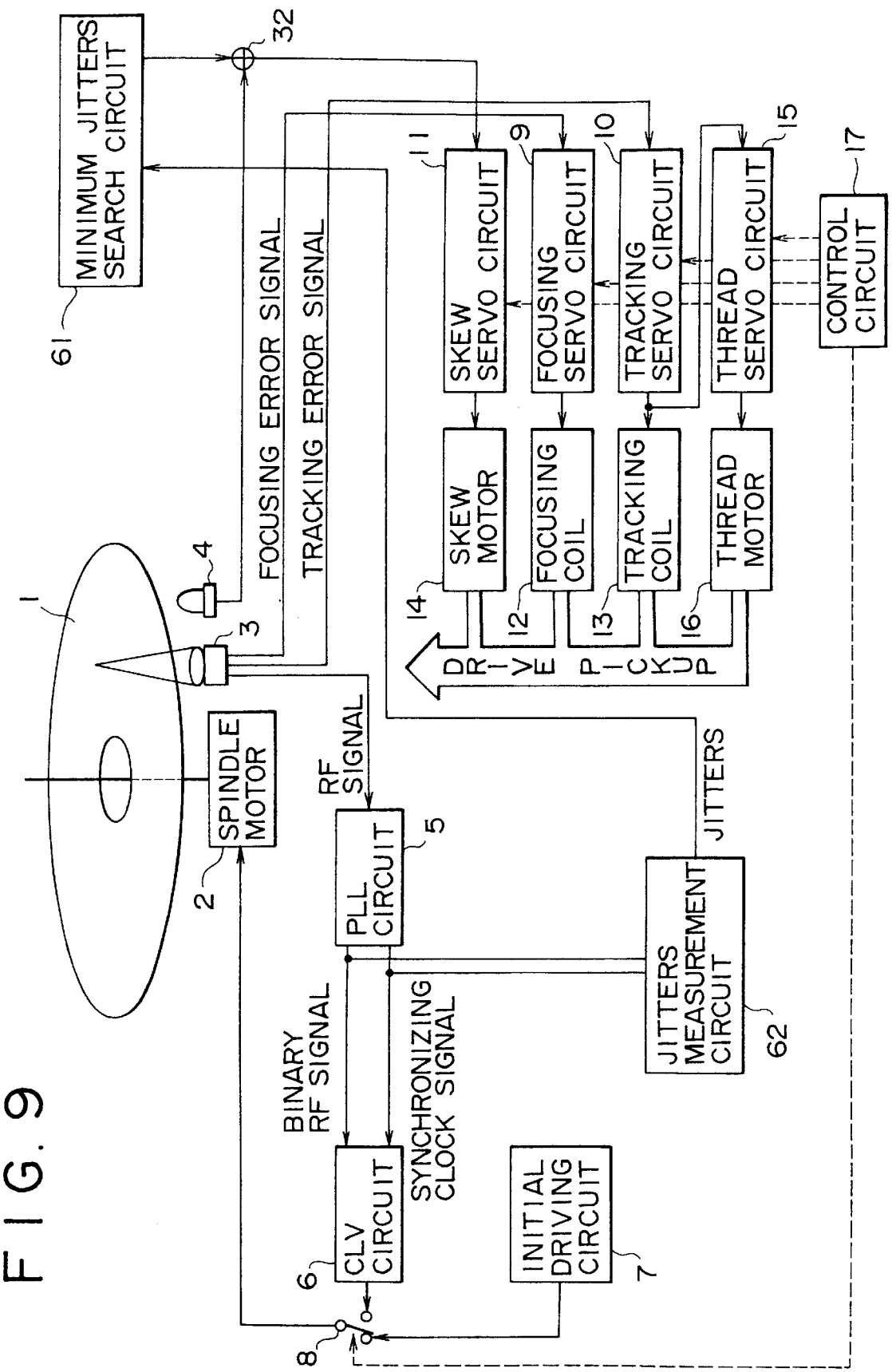

FIG. 9 shows a further optical disk reproduction apparatus in which a further disk driving apparatus according to the present invention is incorporated. Referring to FIG. 9, the optical disk reproduction apparatus shown has a similar construction to that of the optical disk reproduction apparatus described hereinabove with reference to FIG. 1 except that it includes a minimum jitters search circuit 61 in place of the tracking error signal maximum amplitude search circuit 31 of the optical disk reproduction apparatus of FIG. 1 and that it additionally includes a jitters measurement circuit 62 which detects jitters from an output of the PLL circuit 5 and outputs the detected jitters to the minimum jitters search circuit 61. Though not shown, the minimum jitters search circuit 61 includes a level detection circuit, a control circuit and an offset generation circuit which are similar to those of to the tracking error signal maximum amplitude search circuit 31 shown in FIG. 1.

The jitters measurement circuit 62 detects an absolute value of the phase difference between a binary RF signal and a synchronizing clock signal outputted from the PLL circuit 5 and outputs it as jitters to the minimum jitters search circuit 61. The relationship between the jitters and the focus offset is such as illustrated in FIG. 10.

Figure 10:
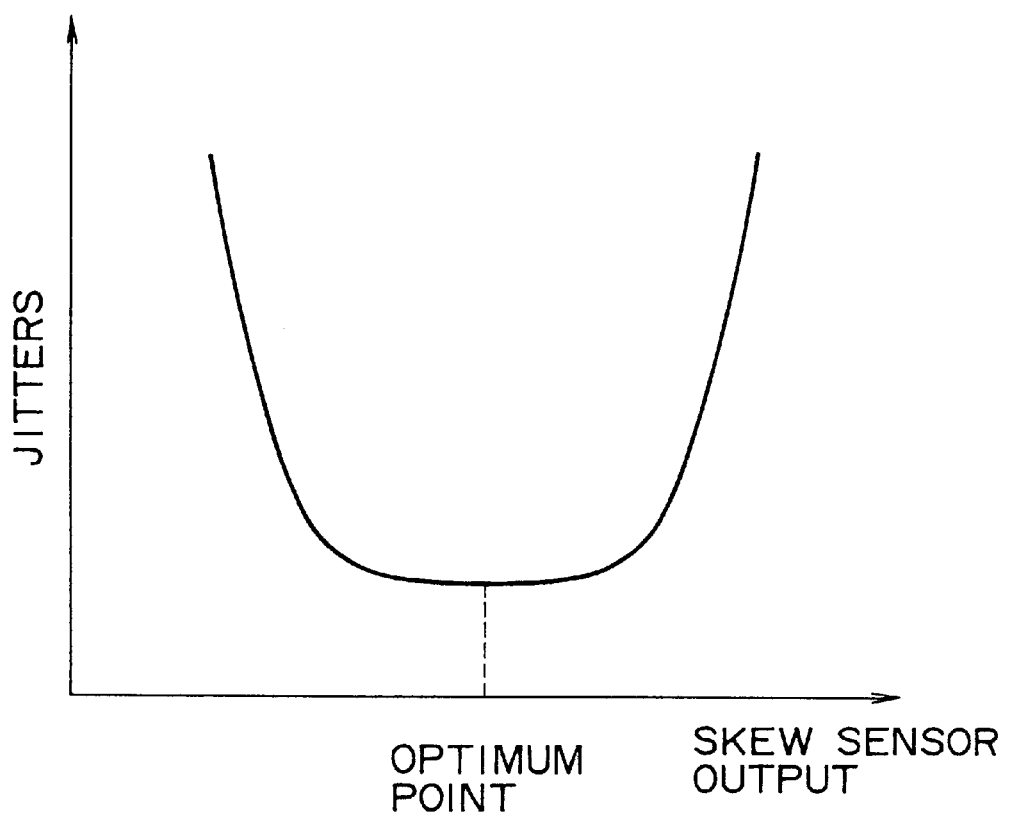
FIG. 10 is a graph illustrating a relationship between a skew sensor output and jitters.

In particular, as seen in FIG. 10, when the relative angle of the optical head 3 with respect to the optical disk 1 is optimum, the jitters are minimum, and as the relative angle is displaced from the optimum position, the jitters increase. Thus, by detecting a minimum value of the jitters, an optimum point of the relative position of the optical head 3 with respect to the optical disk 1 can be determined.

Figure 11:
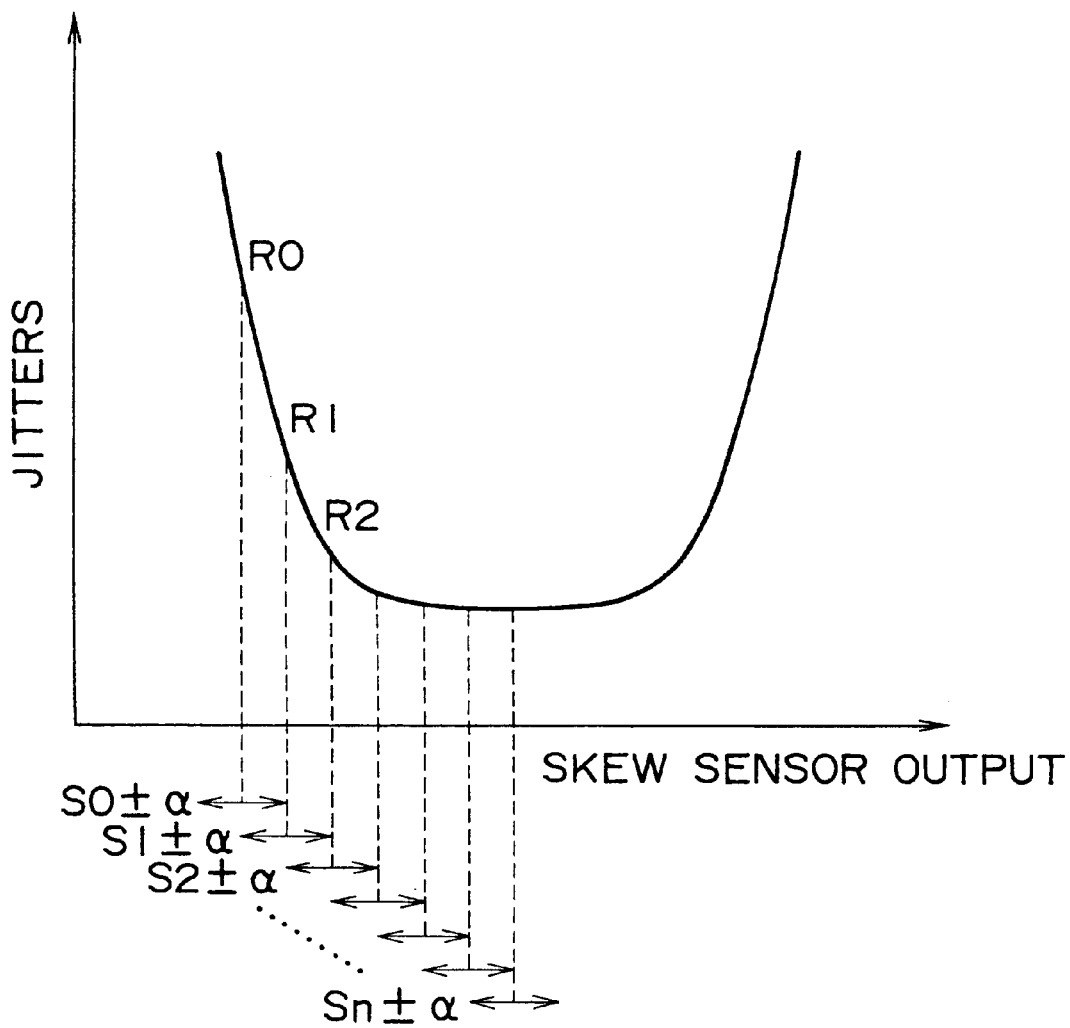
FIG. 11 is a graph illustrating a principle in detecting a minimum value of jitters by a mountain-climbing method.

The minimum value of the jitters can be calculated by a mountain-climbing method as illustrated in FIG. 11. In particular, the sampling point is successively shifted in an increasing direction by α, and when the central sample value is lower than the left and right sample values, a sample point at which the central sample value is obtained is set as an optimum point.

Figure 12:
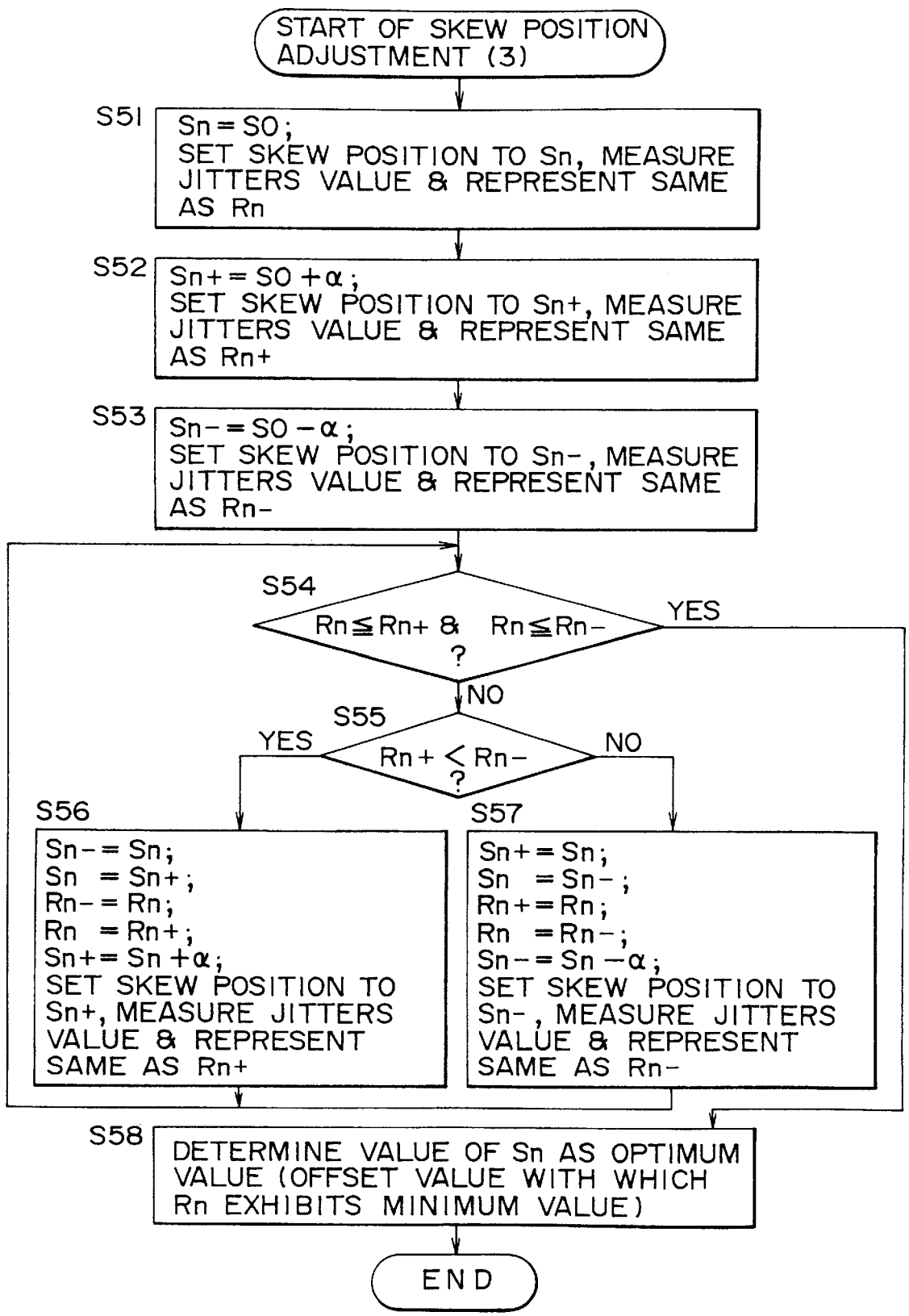
FIG. 12 is a flow chart illustrating processing of detecting a minimum value of jitters by a mountain-climbing method.

FIG. 12 illustrates an example of processing of determining a minimum value of jitters by the mountain-climbing method.

First in step S51, an initial value $S_0$ is placed into Sn. Then, the skew position is set to Sn (in the present instance, $Sn=S_0$), and the amplitude value (magnitude) of jitters in this instance is measured and a result of the measurement is placed into Rn (in the present instance, $Rn=R_0$).

In particular, the control circuit 42 controls the offset generation circuit 43 to generate an offset signal $S_0$. The skew servo circuit 11 controls the skew motor 14 in response to a skew error signal to which the offset signal $S_0$ is added by the adder 32 to adjust the inclination of the optical head 3.

The level detection circuit 41 thereupon detects the amplitude of jitters outputted from the jitters measurement circuit 62 and outputs it to the control circuit 42. The control circuit 42 places the amplitude value detected then into Rn (in the present instance, $Rn=R_0$).

Thereafter, the control sequence advances to step S52, in which a value obtained by addition of $S_0$ and α is placed into Sn+. In particular, the following equation is calculated:

$$Sn+=S_0+\alpha$$

Then, the control circuit 42 controls the offset generation circuit 43 to generate the offset signal Sn+ ($=S_1$). In particular, the control circuit 42 controls the offset generation circuit 43 to generate an offset value higher by α than the offset value generated in step S51. Since the skew servo circuit 11 controls the skew motor 14 in response to the skew error signal to which the offset value is added, the optical head 3 further varies the angle of the optical head 3 by an amount corresponding to the offset value α.

The level detection circuit 41 in this instance detects the amplitude of jitters outputted from the jitters measurement circuit 62. The control circuit 42 places the amplitude of jitters then detected by the level detection circuit 41 into Rn+ (in this instance, $R_0+=R_1$).

Subsequently, the control sequence advances to step S53, in which a value lower by α than $S_0$ is placed into Sn−. In other words, the following equation is calculated:

$$Sn-=S_0-\alpha$$

In particular, the control circuit 42 controls the offset generation circuit 43 to generate a value lower by α than the offset signal Sn (in this instance, $Sn=S_0$) generated in step S51. Since the focus error signal to which the offset signal Sn− is added is supplied to the skew motor 14 via the skew servo circuit 11, the angle of the optical head 3 is varied by an amount corresponding to the offset value $-\alpha$ from that when the offset value $S_0$ was generated.

Then, the level detection circuit 41 detects the amplitude of jitters outputted from the jitters measurement circuit 62 then and outputs it to the control circuit 42. The control circuit 42 places the amplitude value of jitters then into Rn− (in this instance, Rn−=$R_0$−).

By the processing in steps S51 to S53 described above, the amplitude value Rn (=$R_0$) of jitters when the offset value to be added to the focus error signal is set to the initial value $S_0$, the amplitude value Rn+ (=$R_0$+=$R_1$) of jitters when the offset signal is increased by $\alpha$ and the amplitude value Rn− (=$R_0$−) of jitters when the offset value is decreased by $\alpha$ are obtained as seen in FIG. 11.

Thus, the control sequence advances to step S54, in which it is discriminated whether or not Rn is equal to or lower than Rn+ and besides Rn is equal to or lower than Rn−. In other words, it is discriminated whether or not Rn is lower than Rn− and Rn+ (whether or not Rn is a minimum value).

Normally, although the amplitude Rn (=$R_0$) of jitters when the offset signal is $S_0$ is lower than the amplitude value Rn− (=$R_0$−) when the offset signal is lower by $\alpha$ as seen in FIG. 11, it is higher than the amplitude Rn+ (=$R_0$+=$R_1$) of jitters when the offset signal is higher by $\alpha$. Thus, in this instance, the control sequence advances to step S55, in which it is discriminated whether or not Rn+ is lower than Rn−. In this instance, since Rn+ (=$R_0$+=$R_1$) is lower than Rn− (=$R_0$−) (since the curve portion is in a rightwardly descending section in FIG. 11), the control sequence advances to step S56.

In step S56, Sn (=$S_0$) till then is placed into Sn−. Then, Sn+ (=$S_1$) till then is placed into new Sn, Rn (=$R_0$) till then is placed into Rn−, and Rn+ (=$R_1$) till then is placed into Rn. Further, a value (=$S_0$+2$\alpha$=S2) obtained by addition of $\alpha$ to new Sn (=$S_0$+$\alpha$=$S_1$) is placed into Sn+. In other words, the following equation is calculated:

$$Sn+=Sn+\alpha$$

The control circuit 42 controls the offset generation circuit 43 to generate Sn+ (=S2) as an offset signal. In particular, the control circuit 42 controls the offset generation circuit 43 to generate an offset Sn+ (=$S_0$+2$\alpha$=S2) higher by $\alpha$ than Sn+ (=$S_0$+) generated in step S52. Then, the amplitude of jitters detected then is placed into Rn+ (=$R_1$+=$R_2$).

In other words, as a result, the amplitude values of jitters at the three sampling points $S_0$, $S_1$ and S2 shifted rightwardly by $\alpha$ from those in the preceding scanning in the condition shown in FIG. 11 are set to Rn− (=$R_0$), Rn (=$R_1$) and Rn+ (=$R_2$), respectively.

Then, the control sequence returns to step S54, in which it is discriminated whether or not Rn is lower than Rn− and Rn+. When Rn is not a minimum value, the control sequence advances to step S55, in which it is discriminated again whether or not Rn+ is lower than Rn−. When Rn+ is lower than Rn−, the control sequence advances to step S56 so that similar processing is repeated.

Then, when the section for sampling is successively shifted in the rightward direction in FIG. 11 until Sn reaches an optimum point, the amplitude value Rn obtained then is lower than Rn− and lower than Rn+. In other words, Rn is a minimum value. Thus, in this instance, the control sequence advances from step S54 to step S58, in which the value of Sn then is set as an optimum value with which the value of jitters exhibits a maximum value. In other words, the control circuit 42 controls the offset generation circuit 43 to generate the offset signal Sn as an optimum value continuously.

On the other hand, when sampling is proceeding in a rightwardly ascending section in FIG. 11, the value of Rn+ is higher than Rn−. Thus, in this instance, the control sequence advances from step S55 to step S57, in which Sn till then is placed into Sn+, Sn− till then is placed into Sn−, Rn till then is placed into Rn+, and Rn− till then is placed into Rn. Then, a value lower by $\alpha$ than new Sn is placed into Sn−. In other words, the following equation is calculated:

$$Sn-=Sn-\alpha$$

In particular, the sampling point on the left side in FIG. 11 is sampled with Sn−. The amplitude of jitters when the offset signal Sn− is generated from the offset generation circuit 43 is detected, and the detected amplitude value is placed into Rn−.

Then, the control sequence returns to step S54, in which it is discriminated whether or not Rn is lower than Rn− and Rn+. In the rightwardly ascending section in FIG. 11, since Rn is still higher than Rn−, the control sequence advances to step S55 and then from step S55 to S57 so that similar processing is repeated. Then, when the sampling point successively advances in the leftward direction (toward an optimum point) in FIG. 11 until Sn reaches an optimum point, Rn is lower than Rn+ and lower than Rn−. In this instance, the control sequence advances from step S54 to step S58, in which the value of the offset signal Sn then is determined as an optimum value. Then, the control circuit 42 thereafter controls the offset generation circuit 43 to generate the optimum value continuously.

Further, similarly as in the case illustrated in FIG. 6, a sudden descending variation point $Sm_2$ and a sudden ascending variation point $Sm_1$ are calculated, and a middle point between them can be determined as an optimum point with which the jitters exhibit a minimum value.

Figure 13:
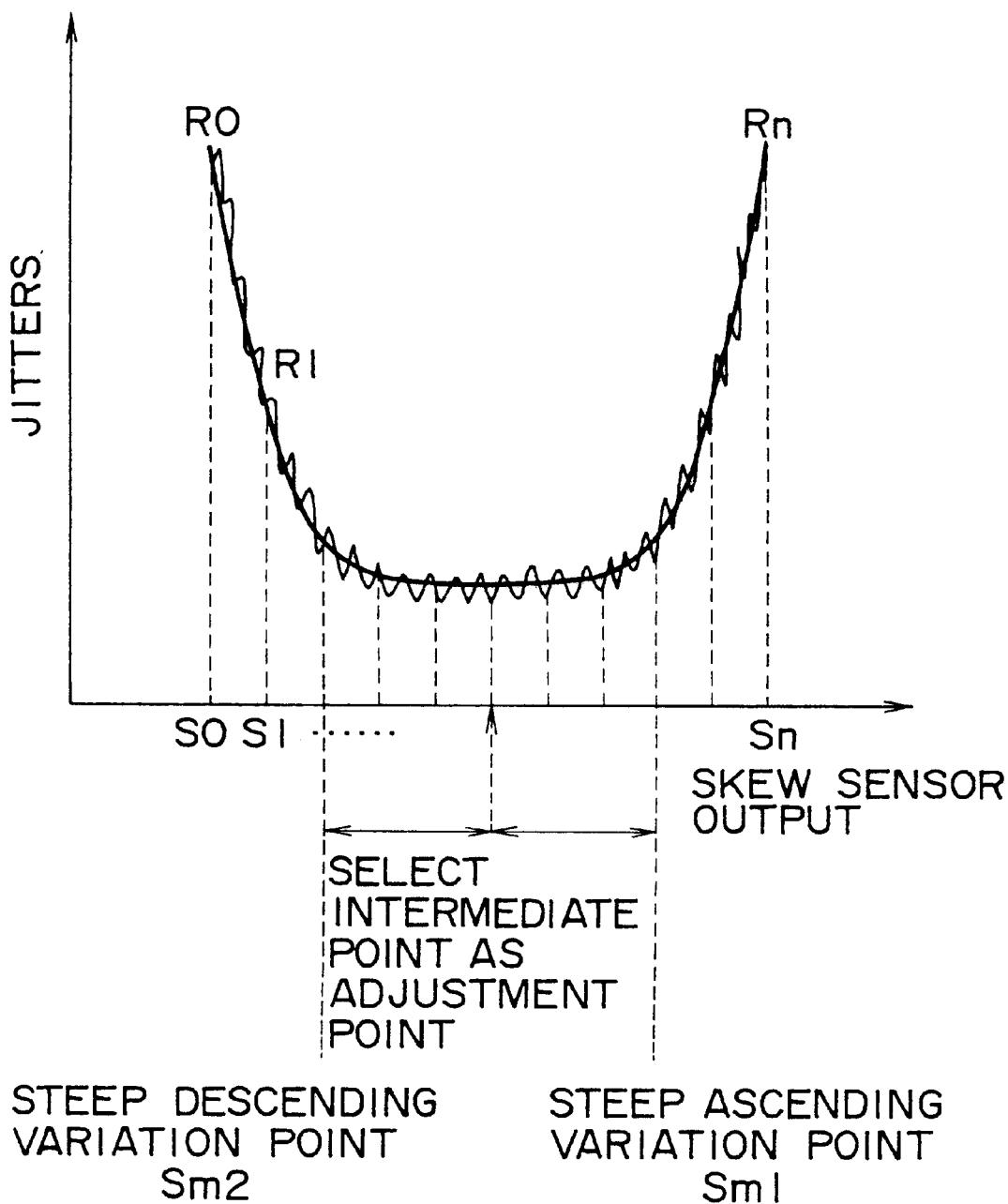
FIG. 13 is a graph illustrating a principle of detecting a minimum value of jitters from two variation points.

In particular, in this instance, in the section of the sample points $S_0$ to Sn, sample values $R_0$ to Rn are calculated in advance as seen in FIG. 13. Then, the variation points $Sm_1$ and $Sm_2$ are determined from those sample values, and a middle point between them is determined.

Figure 14:
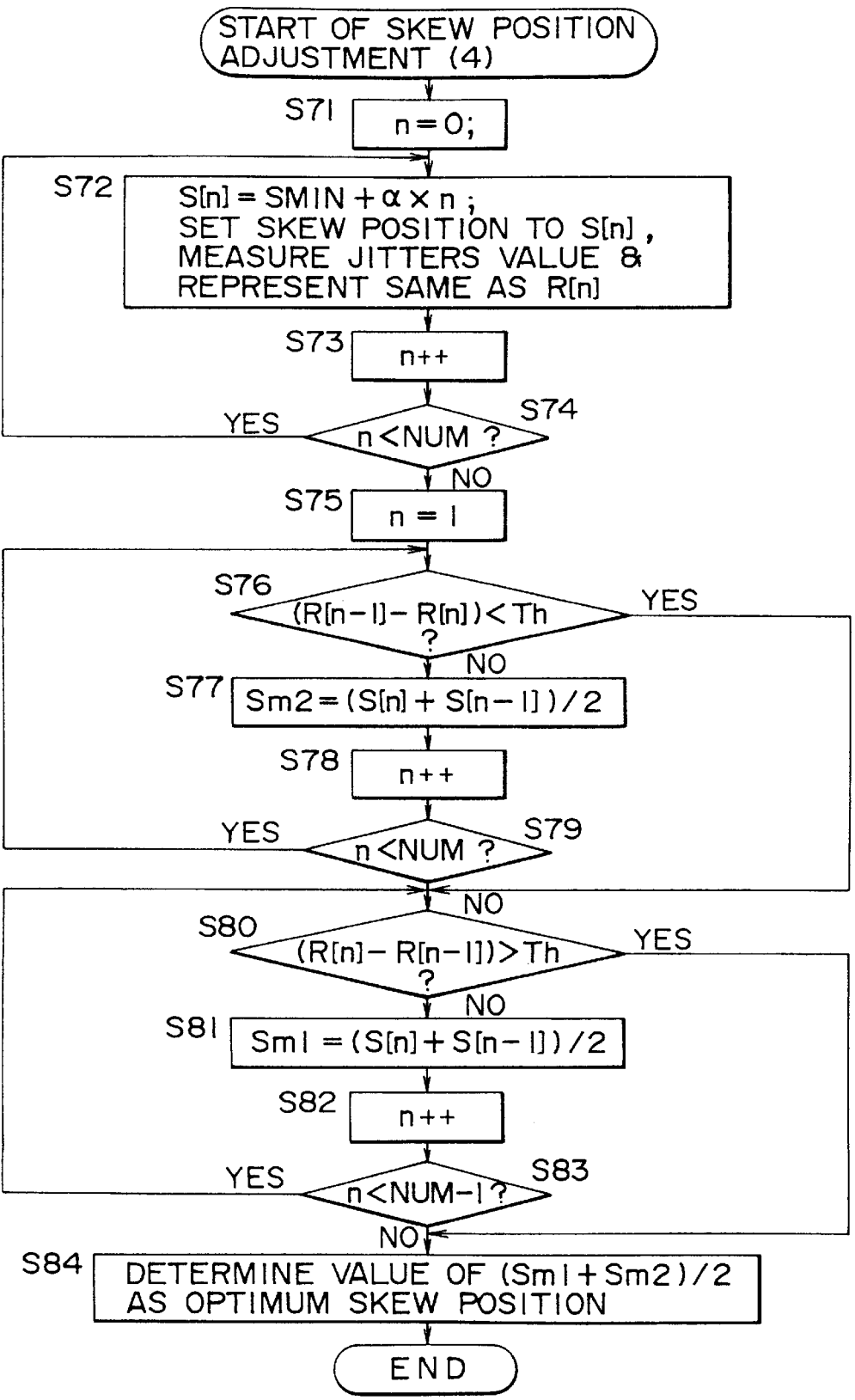
FIG. 14 is a flow chart illustrating an example of processing of detecting a minimum value of jitters in accordance with the principle illustrated in FIG. 13.

FIG. 14 illustrates an example of processing in this instance. In the present processing, 0 is initially placed into the variable n first in step S71, and in step S72, the following equation is calculated:

$$S[n]=SMIN+\alpha \times n$$

where SMIN is the minimum value of the skew adjustment value (offset value), and $\alpha$ represents the width with which the offset signal is varied stepwise.

In the present case, since n=0, S[0] is set to SMIN.

The control circuit 42 controls the offset generation circuit 43 to generate this S[n] (in this instance, S[0]=SMIN). Then, the amplitude of jitters then is detected by the level detection circuit 41, and a value thereof is placed into R[n] (=R[0]).

Thereafter, the control sequence advances to step S73, in which the variable n is incremented by 1 (to n=1). In step S74, it is discriminated whether or not the variable after incremented is lower than NUM. This NUM is a value given, where the maximum value of the offset value is represented by SMAX, by (SMAX−SMIN)/$\alpha$. In other words, NUM represents the number of samples within the skew scanning range.

When n is lower than NUM, since all sampling points are not yet sampled, the control sequence returns to step S72, in which the following equation is calculated:

$$S[n]=SMIN+\alpha \times n$$

In particular, in the present case, a value higher by $\alpha$ than SMIN is set as an offset signal S[1]. Then, the amplitude of jitters when the offset signal S[1] is generated is measured, and a value of it is set as R[1].

Thereafter, the control sequence advances to step S73, in which the variable n is incremented by 1, and in this instance, to n=2. When it is subsequently discriminated in step S74 that the variable n (=2) is lower than NUM, the control sequence returns to step S72 so that similar processing is executed repetitively. In this manner, amplitude values $R_0$ to Rn of jitters at the sampling points of $S_0$ to Sn shown in FIG. 13 are obtained.

When sampling within the search range is completed in such a manner as described above, the variable n becomes equal to NUM. Consequently, the control sequence advances from step S74 to step S75, in which the variable n is initially set to 1. Then in step S76, it is discriminated whether or not the difference between the amplitude value R[n] of the reference point at present and the preceding amplitude value R[n−1] is lower than a reference value Th set in advance. In this instance, it is discriminated whether or not the value of R[0]−R[1] is lower than Th. Since the rightwardly descending characteristic is presented in a first section of the sampling range as shown in FIG. 13, R[0] is sufficiently higher than R[1] (the difference (R[0]−R[1]) between them is higher than Th). Thus, the control sequence advances to step S77, in which a middle value between the sampling points S[n] and S[n−1] is set as the variation point $Sm_2$. In other words, the following equation is calculated:

$$Sm_2=(S[n]+S[n-1])/2$$

In the present case, a middle point between S[1] and S[0] is set as $Sm_2$.

Then, the control sequence advances to step S78, in which the variable n is incremented by 1 (to n=2), and then to step S79, in which it is discriminated whether or not the variable n is lower than NUM. When the variable n is lower than NUM, the control sequence returns to step S76, in which it is discriminated whether or not the value of R[1]−R[2] is lower than Th. As seen in FIG. 13, within a period within which the jitters vary by a great amount, the difference between the two sample values is higher than the reference value Th. Therefore, the control sequence advances again to step S77, in which the value of (S[2]+S[1])/2 is placed into $Sm_2$. In other words, the value on the side rightwardly by α from the location used in the preceding cycle is placed into $Sm_2$.

Then in step S78, the variable n is incremented by 1 again to n=3, and then the control sequence returns from step S79 to step S76 to repetitively execute similar processing.

Then, as the sampling point is successively shifted rightwardly in FIG. 13, the rate of change of jitters decreases gradually. Then, when it becomes discriminated that the value of R[n−1]−R[n] is lower than Th, the control sequence advances from step S76 to step S80. In other words, in this instance, a variation point (sudden descending variation point) from a section in which the rate of change of the amplitude of jitters is high to another section in which the rate of change is low is set as $Sm_2$.

In steps S80 et seq., a point at which the rate of change of the amplitude of jitters increases suddenly from a period within which the rate of change gradually increases to another period within which the rate of change increases suddenly is detected as a sudden ascending variation point $Sm_1$.

To this end, in step S80, it is discriminated whether or not the value of R[n]−R[n−1] is higher than the reference value Th. As shown in FIG. 13, within a period within which the sample value R[n−1] on the left side is higher than the sample value R[n] on the right side (within a rightwardly descending period) and within a period within which the sample value R[n] on the right side is higher than the sample value R[n−1] on the left side but the difference between them is small, the value of R[n]−R[n−1] is lower than the reference value Th. Consequently, the control sequence advances from step S80 to step S81, in which a value between S[n] and S[n−1] is placed into $Sm_1$. In other words, the following equation is calculated:

$$Sm_1=(S[n]+S[n-1])/2$$

Thereafter, n is incremented by 1 in step S82, and it is discriminated in step S83 whether or not the variable n is lower than NUM−1 (whether or not the search range reaches the right end in FIG. 13). When the variable n is lower than NUM−1, the control sequence returns to step S80, in which similar processing is repeated for two sample values spaced by one sample distance on the right side in FIG. 13. Then, when the difference between the two sample values is lower than the reference value Th, the control sequence advances again to step S81, in which a middle value between the two sampling points is placed into $Sm_1$.

When the sampling point is successively shifted in the rightward direction in FIG. 13 in this manner until the sample value R[n] on the right side in FIG. 13 exhibits a sudden increase from the sample value R[n−1] on the left side, the difference between them (R[n]−R[n−1]) is equal to or higher than the reference value Th. In this instance, a middle value between the sampling points s[n−1] and S[n−2] is placed in $Sm_1$. The value then is determined as a sudden ascending variation point $Sm_1$.

Since the sudden descending variation point $Sm_2$ has been calculated in step S77 and the sudden ascending variation point $Sm_1$ has bee calculated in step S81 in this manner, the control sequence advances to step S84, in which a middle point between the variation points $Sm_1$ and $Sm_2$ is determined as an optimum point. In other words, the value of $(Sm_1+Sm_2)/2$ is set as an optimum point.

It is to be noted that, when it is discriminated in step S79 that the variable n is equal to or higher than NUM, the control sequence advances from step S79 to step S80. On the other hand, when it is discriminated in step S83 that the variable n is equal to or higher than NUM−1, the control sequence advances from step S83 to step S84.

Where an optimum point is detected by the method illustrated in FIG. 6 or 13, even if noise is superposed with the tracking error signal, the RF signal or the jitters, an influence by the noise can be reduced.

While the present invention is described taking an optical disk driving apparatus for reproducing an optical disk as an example, the present invention can be applied also to a disk driving apparatus which records or reproduces data onto or from some other disk.

Having now fully described the invention, it will be apparent to one of ordinary skill in the art that many changes and modifications can be made there to without departing from the spirit and scope of the invention as set forth herein.

What is claimed is:

1. A recording and/or reproduction apparatus for a record medium in the form of a disk, comprising:

pickup means for recording and/or reproducing information onto or from the disk;

control means for controlling a relative inclination between said pickup means and the disk by determining the optimum position between the pickup means and the disk in response to an amplitude value of a tracking error signal or a jitter signal generated from the signal reproduced by said pickup means; and means for varying the relative inclination between said pickup means and the disk in response to said control means;

wherein said control means includes offset signal generating means for generating a plurality of offset signals; sampling means for sampling the amplitude value of tracking error signal or jitter signal at a plurality of sampling points according to said offset signals dispersively; comparing means for comparing said amplitude value of each sampling point with each other; and determining means for determining the optimum position between the pickup means and the disk according to a comparison result of said comparing means.

2. A recording and/or reproduction apparatus according to claim 1, further comprising:

detection means for detecting, upon recording or reproduction, the relative inclination between said pickup means and the disk; and addition means for adding a result of the detection of said detection means to the result of said control means.

3. A recording and/or reproduction apparatus according to claim 1, wherein said control means includes search means for searching, based on the signal reproduced by said pickup means, for a positional relationship with which the relative inclination between said pickup means and the disk exhibits a minimum value.

4. A recording and/or reproduction apparatus according claim 3, wherein said search means detects a middle point between a point at which a rate of increase of the signal reproduced by said pickup means is high and another point at which a rate of decrease of the signal is high and searches for the positional relationship with which the relative inclination between said pickup means and the disk exhibits a minimum value based on the middle point.

5. A recording and/or reproduction apparatus according to claim 1, wherein said control means detects the relative inclination between said pickup means and the disk based on said amplitude of said tracking error signal.

6. A recording and/or reproduction apparatus according to claim 1, wherein said control means detects the relative position between said pickup means and the disk on said jitters.

7. A recording and/or reproduction method for a record medium in the form of a disk, comprising the steps of:

recording and/or reproducing information onto or from a disk by pickup means;

controlling a relative inclination between said pickup means and the disk by generating a plurality of offset signals, sampling the amplitude value of tracking error signal or jitter signal at a plurality of sampling points according to said offset signals dispersively; comparing said amplitude value of each sampling point with each other; and determining the optimum position between the pickup means and the disk according to a comparison result; and varying the relative inclination between said pickup means and the disk in response to the controlling step.

8. A recording and/or reproduction method according to claim 7, further comprising the steps of:

detecting, upon recording or reproduction, the relative inclination between said pickup means and the disk;

adding a result of the detection to the result of the controlling step.

9. A recording and/or reproduction method according to claim 7, wherein the controlling step includes the step of searching, based on the signal reproduced by said pickup means, for a positional relationship with which the relative inclination between said pickup means and the disk exhibits a minimum value.

10. A recording and/or reproduction apparatus according to claim 9, wherein the searching step includes the step of comparing magnitudes of at least two adjacent points of the signal reproduced by said pickup means.

11. A recording and/or reproduction method according to claim 9, wherein the searching step includes the step of detecting a middle point between a point at which a rate of increase of the signal reproduced by said pickup means is high and another point at which a rate of decrease of the signal is high.

12. A recording and/or reproduction method according to claim 7, wherein the detecting step detects the relative inclination between said pickup means and the disk based on said amplitude of said tracking error signal.

13. A recording and/or reproduction method according to claim 7, wherein the detecting step detects the relative position between said pickup means and the disk based on jitters.

* * * * *